(12) United States Patent
Ohgata et al.

(10) Patent No.: US 10,662,977 B2
(45) Date of Patent: May 26, 2020

(54) VEHICLE HYDRAULIC SYSTEM

(71) Applicant: TOYOTA JIDOSHA KABUSHIKI KAISHA, Toyota-shi, Aichi (JP)

(72) Inventors: Yusuke Ohgata, Miyoshi (JP); Hiromitsu Nitani, Okazaki (JP)

(73) Assignee: TOYOTA JIDOSHA KABUSHIKI KAISHA, Tokyo (JP)

(*) Notice: Subject to any disclaimer, the term of this patent is extended or adjusted under 35 U.S.C. 154(b) by 1 day.

(21) Appl. No.: 16/124,390

(22) Filed: Sep. 7, 2018

(65) Prior Publication Data

US 2019/0093677 A1 Mar. 28, 2019

(30) Foreign Application Priority Data

Sep. 22, 2017 (JP) .................. 2017-183055

(51) Int. Cl.
| | | |
|---|---|---|
| *F15B 11/17* | (2006.01) | |
| *F16H 61/00* | (2006.01) | |
| *F16H 57/04* | (2010.01) | |
| *F01M 1/16* | (2006.01) | |
| *F01M 1/02* | (2006.01) | |

(Continued)

(52) U.S. Cl.
CPC .............. *F15B 11/17* (2013.01); *F01M 1/02* (2013.01); *F01M 1/16* (2013.01); *F16H 57/0434* (2013.01); *F16H 61/0025* (2013.01); *F16H 61/0031* (2013.01); *F01M 2001/123* (2013.01); *F15B 2211/20523* (2013.01); *F15B 2211/20576* (2013.01); *F15B 2211/30505* (2013.01); *F15B 2211/329* (2013.01); *F15B 2211/40515* (2013.01); *F15B 2211/45* (2013.01); *F15B 2211/50518* (2013.01); *F16H 2059/366* (2013.01)

(58) Field of Classification Search
CPC ............. F16H 57/0434; F16H 57/0435; F16H 57/0441; F15B 11/17
See application file for complete search history.

(56) References Cited

U.S. PATENT DOCUMENTS 8,516,811 B2 * 8/2013 Oka ...................... E02F 9/2246
60/421
9,500,277 B2 * 11/2016 Jo ....................... F16H 61/0025

FOREIGN PATENT DOCUMENTS

| JP | 2003-194198 A | 7/2003 |
| JP | 2010-261509 A | 11/2010 |
| JP | 2012-246959 A | 12/2012 |

* cited by examiner

*Primary Examiner* — Kevin F Murphy
(74) *Attorney, Agent, or Firm* — Oliff PLC

(57) ABSTRACT

A vehicle hydraulic system includes: (a) a hydraulic pump device to be driven by a vehicle drive source to eject a working fluid through first and second outlet ports; (b) a first line passage that guides the working fluid ejected through the first outlet port, with a hydraulic pressure being regulated to a relatively high value; (c) a downstream-side passage in which the hydraulic pressure is regulated to a relatively low value; (d) a path-switching valve device configured to allow the working fluid ejected through the second outlet port, to flow into the first line passage, when the hydraulic pressure is lower than a predetermined value, and configured to allow the working fluid ejected through the second outlet port, to flow into the downstream-side passage, when the hydraulic pressure is higher than the predetermined value; and (e) a bypass passage provided between the second outlet port and the downstream-side passage.

13 Claims, 8 Drawing Sheets

(51) Int. Cl.
*F01M 1/12* (2006.01)
*F16H 59/36* (2006.01)

VEHICLE HYDRAULIC SYSTEM

This application claims priority from Japanese Patent Application No. 2017-183055 filed on Sep. 22, 2017, the disclosure of which is herein incorporated by reference in its entirety.

FIELD OF THE INVENTION

The present invention relates to a hydraulic system for a vehicle, and more particularly to such a hydraulic system including a hydraulic pump device having two outlet ports.

BACKGROUND OF THE INVENTION

In a hydraulic pump device configured to pump working fluid or lubricant fluid by a drive force generated by an internal combustion engine (vehicle drive source), an ejection capacity of the pump device varies depending on a rotational speed of the vehicle drive source. Therefore, there is a risk that a required hydraulic pressure could not be ensured due to insufficiency of the ejection capacity when the rotational speed of the vehicle drive source is low.

From a point of view of parts requiring the working fluid or lubricant fluid, there are a high-hydraulic-pressure required part to which a relatively high hydraulic pressure is required to be supplied and a low-hydraulic-pressure required part to which a relatively low hydraulic pressure is required to be supplied.

In a vehicle hydraulic system disclosed in JP2010-261509A in which the hydraulic pump device includes a main pump and also a sub pump, the working fluid is supplied to the high-hydraulic-pressure required part from both of the main pump and the sub pump when the rotational speed of the vehicle drive source is so low that the ejection capacity of the main pump is insufficient, and a supply destination to which the working fluid ejected from the sub pump is to be supplied is automatically switched from the high-hydraulic-pressure required part to the low-hydraulic-pressure required part when the rotational speed of the vehicle drive source is so high that the ejection capacity of the main pump is sufficient. Therefore, in the disclosed vehicle hydraulic system, the sub pump as well as the main pump supplies the working fluid to the high-hydraulic-pressure required part when the rotational speed of the vehicle drive source is low, and the sub pump supplies the working fluid to the low-hydraulic-pressure required part without supplying the working fluid to the high-hydraulic-pressure required part when the rotational speed of the vehicle drive source is high. Thus, when the rotational speed of the vehicle drive source is high, a load of the sub pump is reduced.

SUMMARY OF THE INVENTION

In the above-described vehicle hydraulic system, when the rotational speed of the vehicle drive source is low, the sub pump as well as the main pump can supply the working fluid to the high-hydraulic-pressure required part. However, a certain amount of the working fluid or lubricant fluid is required to be supplied to also the low-hydraulic-pressure required part. To this end, it might be possible to employ an arrangement in which while the working fluid is supplied to the high-hydraulic-pressure required part from the main pump and the sub pump, a part of the working fluid supplied to the high-hydraulic-pressure required part is delivered to the low-hydraulic-pressure required part.

However, in the above arrangement in which the part of the working fluid supplied to the high-hydraulic-pressure required part is delivered to the low-hydraulic-pressure required part, when the rotational speed of the vehicle drive source is high, there is a risk that the ejection capacity of the main pump could be insufficient because a load of the main pump, which is the only one pump supplying the working fluid to the high-hydraulic-pressure required part, is increased. Therefore, there is a problem that the main pump has to be made large in size for increasing the ejection capacity. Further, there is another problem that the supply of the working fluid from the sub pump to the high-hydraulic-pressure required part is stopped when the rotational speed of the vehicle drive source is increased to a certain speed value, wherein the certain speed value has to be set to be a high speed value, so that the load of the sub pump cannot be easily reduced whereby a fuel economy of the vehicle cannot be easily improved.

The present invention was made in view of the background art described above. It is therefore an object of the present invention to provide a vehicle hydraulic system in which the working fluid or lubricant fluid can be sufficiently supplied not only to the high-hydraulic-pressure required part but also to low-hydraulic-pressure required part even when the rotational speed of the vehicle drive source is low, while the increase of size of the main pump is avoided or the fuel economy of the vehicle is improved owing to reduction of the load of the sub pimp.

The object indicated above is achieved according to the following aspects of the present invention.

According to a first aspect of the invention, there is provided a hydraulic system for a vehicle, including: a hydraulic pump device which is to be driven by a vehicle drive source of the vehicle to eject a working fluid through first and second outlet ports of the hydraulic pump device; a first line passage that guides at least the working fluid ejected through the first outlet port, with a hydraulic pressure in the first line passage being regulated to a first line pressure value; a downstream-side passage in which the hydraulic pressure is regulated to a downstream-side pressure value that is lower than the first line pressure value; a first path-switching valve device which is configured to allow the working fluid ejected through the second outlet port, to flow into the first line passage, when the hydraulic pressure in the first line passage is lower than a first predetermined pressure value, and which is configured to allow the working fluid ejected through the second outlet port, to flow into the downstream-side passage, when the hydraulic pressure in the first line passage is higher than the first predetermined pressure value; and a bypass passage which is provided between the second outlet port and the downstream-side passage.

According to a second aspect of the invention, in the hydraulic system according to the first aspect of the invention, the hydraulic pump device includes two mechanically-operated hydraulic pumps which are to be driven by the vehicle drive source, and the two mechanically-operated hydraulic pumps includes a first pump provided with the first outlet port and a second pump provided with the second outlet port.

According to a third aspect of the invention, in the hydraulic system according to the first aspect of the invention, the hydraulic pump device includes a single mechanically-operated hydraulic pump which is to be driven by the vehicle drive source and which is provided with the first and second outlet ports.

According to a fourth aspect of the invention, in the hydraulic system according to any one of the first through third aspects of the invention, the first path-switching valve device includes: a first flow-control valve that is configured to allow the working fluid ejected through the second outlet port, to flow out to the downstream-side passage, depending on increase of the hydraulic pressure in the first line passage; and a first one-way valve which is disposed between the second outlet port and the first line passage, and which is configured to allow the working fluid to flow in a direction away from the second outlet port toward the first line passage and to inhibit the working fluid to flow in a direction away from the first line passage toward the second outlet port.

According to a fifth aspect of the invention, in the hydraulic system according to any one of the first through fourth aspects of the invention, a first line-pressure-relief regulator valve is provided to cause the hydraulic pressure in the first line passage to be regulated to the first line pressure value, by allowing a part of the working fluid in the first line passage to flow out to the downstream-side passage.

According to a sixth aspect of the invention, in the hydraulic system according to the fourth or fifth aspect of the invention, the downstream-side passage includes (i) a second line passage in which the hydraulic pressure is regulated to a second line pressure value that is lower than the first line pressure value, and (ii) a lubricating passage in which the hydraulic pressure is regulated to a lubricant pressure value that is lower than the second line pressure value. The hydraulic system includes: a second path-switching valve device including (a) a second flow-control valve that is configured to allow the working fluid having flowed into an intermediate connecting passage from the first flow-control valve, to flow out to the lubricating passage, depending on increase of the hydraulic pressure in the second line passage, and (b) a second one-way valve which is disposed between the intermediate connecting passage and the second line passage, and which is configured to allow the working fluid to flow in a direction away from the intermediate connecting passage toward the second line passage and to inhibit the working fluid to flow in a direction away from the second line passage toward the intermediate connecting passage, the second path-switching valve device being configured to allow the working fluid to flow from the intermediate connecting passage to the second line passage, when the hydraulic pressure in the second line passage is lower than a second predetermined pressure value, and which is configured to allow the working fluid to flow from the intermediate connecting passage to the lubricating passage, when the hydraulic pressure in the second line passage is higher than the second predetermined pressure value; and a second line-pressure-relief regulator valve that is configured to cause the hydraulic pressure in the second line passage to be regulated to the second line pressure value, by allowing a part of the working fluid in the second line passage to flow out to the lubricating passage. The bypass passage includes a first bypass passage which is provided between the second outlet port and the intermediate connecting passage and a second bypass passage which is provided between the intermediate connecting passage and the lubricating passage.

According to a seventh aspect of the invention, in the hydraulic system according to the sixth aspect of the invention, the first bypass passage provides a flow resistance acting on the working fluid flowing through the first bypass passage, such that the flow resistance provided by the first bypass passage is higher than a flow resistance acting on the working fluid flowing through the first flow-control valve between the second outlet port and the intermediate connecting passage, and the second bypass passage provides a flow resistance acting on the working fluid flowing through the second bypass passage, such that the flow resistance provided by the second bypass passage is higher than a flow resistance acting on the working fluid flowing through the second flow-control valve between the intermediate connecting passage and the lubricating passage.

According to an eighth aspect of the invention, in the hydraulic system according to the sixth or seventh aspect of the invention, the first line passage is connected to a first hydraulic-control unit that is configured to control a hydraulically-operated power transmission device, such that the working fluid passing through the first line passage is supplied to the first hydraulic-control unit, the second line passage is connected to a second hydraulic-control unit that is configured to control a torque convertor, such that the working fluid passing through the second line passage is supplied to the second hydraulic-control unit, and the lubricating passage is connected to a lubrication-required part, such that the working fluid passing through the lubricating passage is supplied as a lubricant fluid to the lubrication-required part.

According to a ninth aspect of the invention, in the hydraulic system according to any one of the sixth through eighth aspects of the invention, the first flow-control valve and the first line-pressure-relief regulator valve cooperate with each other to constitute a first pair of valves, and the second flow-control valve and the second line-pressure-relief regulator valve cooperate with each other to constitute a second pair of valves, and each of at least one of the first pair of valves and the second pair of valves is provided in a single pressure-relief-control valve.

According to a tenth aspect of the invention, in the hydraulic system according to any one of the first through third aspects of the invention, the first path-switching valve device includes an electromagnetic switching valve which is configured to cause the second outlet port to be in communication with the first line passage, when the hydraulic pressure in the first line passage is lower than the first predetermined pressure value, and which is configured to cause the second outlet port to be in communication with the downstream-side passage, when the hydraulic pressure in the first line passage is higher than the first predetermined pressure value.

According to an eleventh aspect of the invention, in the hydraulic system according to the tenth aspect of the invention, the bypass passage provides a flow resistance acting on the working fluid flowing through the bypass passage, such that the flow resistance provided by the bypass passage is higher than a flow resistance acting on the working fluid flowing through the electromagnetic switching valve between the second outlet port and the downstream-side passage.

According to a twelfth aspect of the invention, in the hydraulic system according to any one of the first through fifth, tenth and eleventh aspects of the invention, the downstream-side passage includes a lubricating passage in which the hydraulic pressure is regulated to a lubricant pressure value that is lower than the first line pressure value.

According to a thirteenth aspect of the invention, in the hydraulic system according to any one of the sixth through ninth and twelfth aspects of the invention, a lubricant-pressure-relief regulator valve is provided to cause the hydraulic pressure in the lubricating passage to be regulated to the lubricant pressure value, by allowing a part of the working fluid in the lubricating passage to flow out to a discharge passage.

In the hydraulic system according to the first aspect of the invention, the first path-switching valve device is provided to allow the working fluid ejected through the second outlet port, to flow into the first line passage, when the hydraulic pressure in the first line passage is lower than a first predetermined pressure value, and to allow the working fluid ejected through the second outlet port, to flow into the downstream-side passage, when the hydraulic pressure in the first line passage is higher than the first predetermined pressure value; and the bypass passage is provided between the second outlet port and the downstream-side passage. When a rotational speed of the vehicle drive source is high, the working fluid ejected through the second outlet port is supplied to the downstream-side passage through the first path-switching valve device. When the rotational speed of the vehicle drive source is low, the working fluid ejected through the second outlet port is supplied to the downstream-side passage through the bypass passage. Irrespective of whether the rotational speed of the vehicle drive source is high or low, the working fluid is supplied from the second outlet port to the downstream-side passage, so that the load of the ejection of the working fluid through the first outlet port of the hydraulic pump device is reduced. Further, with increase of the rotational speed of the vehicle drive source, the supply destination of the working fluid supplied from the second outlet port is automatically switched from the first line passage to the downstream-side passage. It is therefore possible to avoid increase of size of a portion of the hydraulic pump device which is involved in the ejection of the working fluid through the first outlet port, or possible to reduce the load of a portion of the hydraulic pump device which is involved in the ejection of the working fluid through the second outlet port and accordingly to improve the fuel economy of the vehicle.

In the hydraulic system according to the second aspect of the invention, the hydraulic pump device includes two mechanically-operated hydraulic pumps which are to be driven by the vehicle drive source, and the two mechanically-operated hydraulic pumps includes a first pump provided with the first outlet port and a second pump provided with the second outlet port. Since the first outlet port and the second outlet port are operated independently from each other, the ejection capacity of each of the first and second outlet ports can be easily set individually from the other.

In the hydraulic system according to the third aspect of the invention, the hydraulic pump device includes a single mechanically-operated hydraulic pump which is to be driven by the vehicle drive source and which is provided with the first and second outlet ports. The hydraulic pump device can be made compact in size as a whole, since the hydraulic pump device can be constituted by the single mechanically-operated hydraulic pump provided with the first and second outlet ports.

In the hydraulic system according to the fourth aspect of the invention, the first path-switching valve device includes: a first flow-control valve that is configured to allow the working fluid ejected through the second outlet port, to flow out to the downstream-side passage, depending on increase of the hydraulic pressure in the first line passage; and a first one-way valve which is disposed between the second outlet port and the first line passage, and which is configured to allow the working fluid to flow in a direction away from the second outlet port toward the first line passage and to inhibit the working fluid to flow in a direction away from the first line passage toward the second outlet port. Thus, depending on increase of the hydraulic pressure in the first line passage, a supply destination to which the working fluid ejected through the second outlet port is to be supplied is automatically switched from the first line passage to the downstream-side passage.

In the hydraulic system according to the fifth aspect of the invention, the first line-pressure-relief regulator valve is provided to cause the hydraulic pressure in the first line passage to be regulated to the first line pressure value, by allowing a part of the working fluid in the first line passage to flow out to the downstream-side passage. Thus, depending on increase of the hydraulic pressure in the first line passage, a supply path of the working fluid from the first line passage to the downstream-side passage is automatically established, thereby making it possible to restrain an excessive increase of the hydraulic pressure in the first line passage, and to effectively utilize an excess of the hydraulic pressure in the first line passage for increasing the hydraulic pressure in the downstream-side passage.

In the hydraulic system according to the sixth aspect of the invention, the downstream-side passage includes (i) a second line passage in which the hydraulic pressure is regulated to a second line pressure value that is lower than the first line pressure value, and (ii) a lubricating passage in which the hydraulic pressure is regulated to a lubricant pressure value that is lower than the second line pressure value. The hydraulic system includes: a second path-switching valve device including (a) a second flow-control valve that is configured to allow the working fluid having flowed into an intermediate connecting passage from the first flow-control valve, to flow out to the lubricating passage, depending on increase of the hydraulic pressure in the second line passage, and (b) a second one-way valve which is disposed between the intermediate connecting passage and the second line passage, and which is configured to allow the working fluid to flow in a direction away from the intermediate connecting passage toward the second line passage and to inhibit the working fluid to flow in a direction away from the second line passage toward the intermediate connecting passage, the second path-switching valve device being configured to allow the working fluid to flow from the intermediate connecting passage to the second line passage, when the hydraulic pressure in the second line passage is lower than a second predetermined pressure value, and which is configured to allow the working fluid to flow from the intermediate connecting passage to the lubricating passage, when the hydraulic pressure in the second line passage is higher than the second predetermined pressure value; and a second line-pressure-relief regulator valve that is configured to cause the hydraulic pressure in the second line passage to be regulated to the second line pressure value, by allowing a part of the working fluid in the second line passage to flow out to the lubricating passage. The bypass passage includes a first bypass passage which is provided between the second outlet port and the intermediate connecting passage and a second bypass passage which is provided between the intermediate connecting passage and the lubricating passage. Thus, depending on increase of the hydraulic pressure in the second line passage, a supply path of the working fluid from the second line passage to the lubricating passage is automatically established, thereby making it possible to restrain an excessive increase of the hydraulic pressure in the second line passage, and to effectively utilize an excess of the hydraulic pressure in the second line passage for increasing the hydraulic pressure in the lubricating passage.

In the hydraulic system according to the seventh aspect of the invention, the first bypass passage provides a flow resistance acting on the working fluid flowing through the first bypass passage, such that the flow resistance provided by the first bypass passage is higher than a flow resistance acting on the working fluid flowing through the first flow-control valve between the second outlet port and the intermediate connecting passage, and the second bypass passage provides a flow resistance acting on the working fluid flowing through the second bypass passage, such that the flow resistance provided by the second bypass passage is higher than a flow resistance acting on the working fluid flowing through the second flow-control valve between the intermediate connecting passage and the lubricating passage. Thus, when the ejection capacity through the second outlet port is low with the rotational speed of the vehicle drive source being low, the supply of the working fluid to the second line passage or the lubricating passage is made, while being limited by a certain degree that is dependent on the high flow resistance of the first and second bypass passages. When the ejection capacity through the second outlet port is high with the rotational speed of the vehicle drive source being high, the supply of the working fluid to the second line passage or the lubricating passage is made, while being limited by a small degree that is smaller than the above-described certain degree. That is, the supply of the working fluid to the second line passage or the lubricating passage is increased with increase of the ejection capacity through the second outlet port.

In the hydraulic system according to the eighth aspect of the invention, the first line passage is connected to a first hydraulic-control unit that is configured to control a hydraulically-operated power transmission device, such that the working fluid passing through the first line passage is supplied to the first hydraulic-control unit, the second line passage is connected to a second hydraulic-control unit that is configured to control a torque convertor, such that the working fluid passing through the second line passage is supplied to the second hydraulic-control unit, and the lubricating passage is connected to a lubrication-required part, such that the working fluid passing through the lubricating passage is supplied as a lubricant fluid to the lubrication-required part. Thus, the working fluid is supplied to each of the first hydraulic-control unit configured to control the hydraulically-operated power transmission device, the second hydraulic-control unit configured to control the torque convertor and the lubrication-required part, with the hydraulic pressure having a value suitable for a corresponding one of the first and second hydraulic-control units and lubrication-required part.

In the hydraulic system according to the ninth aspect of the invention, the first flow-control valve and the first line-pressure-relief regulator valve cooperate with each other to constitute a first pair of valves, and the second flow-control valve and the second line-pressure-relief regulator valve cooperate with each other to constitute a second pair of valves, and each of at least one of the first pair of valves and the second pair of valves is provided in a single pressure-relief-control valve. Thus, the vehicle hydraulic system can be made compact in size with a reduced number of components.

In the hydraulic system according to the tenth aspect of the invention, the first path-switching valve device includes an electromagnetic switching valve which is configured to cause the second outlet port to be in communication with the first line passage, when the hydraulic pressure in the first line passage is lower than the first predetermined pressure value, and which is configured to cause the second outlet port to be in communication with the downstream-side passage, when the hydraulic pressure in the first line passage is higher than the first predetermined pressure value. Thus, the switch of the supply destination of the working fluid ejected through the second outlet port, from the first line passage to the downstream-side passage, is made by operation of the electromagnetic switching valve. Since the operation of the electromagnetic switching valve is controlled by an electronic control unit, it is possible to easily adjust or change a condition to be satisfied to switch the supply path of the working fluid ejected through the second outlet port.

In the hydraulic system according to the eleventh aspect of the invention, the bypass passage provides a flow resistance acting on the working fluid flowing through the bypass passage, such that the flow resistance provided by the bypass passage is higher than a flow resistance acting on the working fluid flowing through the electromagnetic switching valve between the second outlet port and the downstream-side passage. Thus, when the ejection capacity through the second outlet port is low with the rotational speed of the vehicle drive source being low, the supply of the working fluid to the downstream-side passage is made, while being limited by a certain degree that is dependent on the high flow resistance of the bypass passage. When the ejection capacity through the second outlet port is high with the rotational speed of the vehicle drive source being high, the supply of the working fluid to the downstream-side passage is made, while being limited by a small degree that is smaller than the above-described certain degree. That is, the supply of the working fluid to the downstream-side passage is increased with increase of the ejection capacity through the second outlet port.

In the hydraulic system according to the twelfth aspect of the invention, the downstream-side passage includes a lubricating passage in which the hydraulic pressure is regulated to a lubricant pressure value that is lower than the first line pressure value. When the rotational speed of the vehicle drive source is high, the working fluid ejected through the second outlet port is supplied to the lubricating passage through the first path-switching valve device. When the rotational speed of the vehicle drive source is low, the working fluid ejected through the second outlet port is supplied to the lubricating passage through the bypass passage. It is possible to avoid increase of size of a portion of the hydraulic pump device which is involved in the ejection of the working fluid through the first outlet port, or possible to reduce the load of a portion of the hydraulic pump device which is involved in the ejection of the working fluid through the second outlet port and accordingly to improve the fuel economy of the vehicle.

In the hydraulic system according to the thirteenth aspect of the invention, the lubricant-pressure-relief regulator valve is provided to cause the hydraulic pressure in the lubricating passage to be regulated to the lubricant pressure value, by allowing a part of the working fluid in the lubricating passage to flow out to a discharge passage. Thus, it is possible to restrain excessive increase of the hydraulic pressure in the lubricating passage.

DETAILED DESCRIPTION OF PREFERRED EMBODIMENTS

First Embodiment

Figure 1:
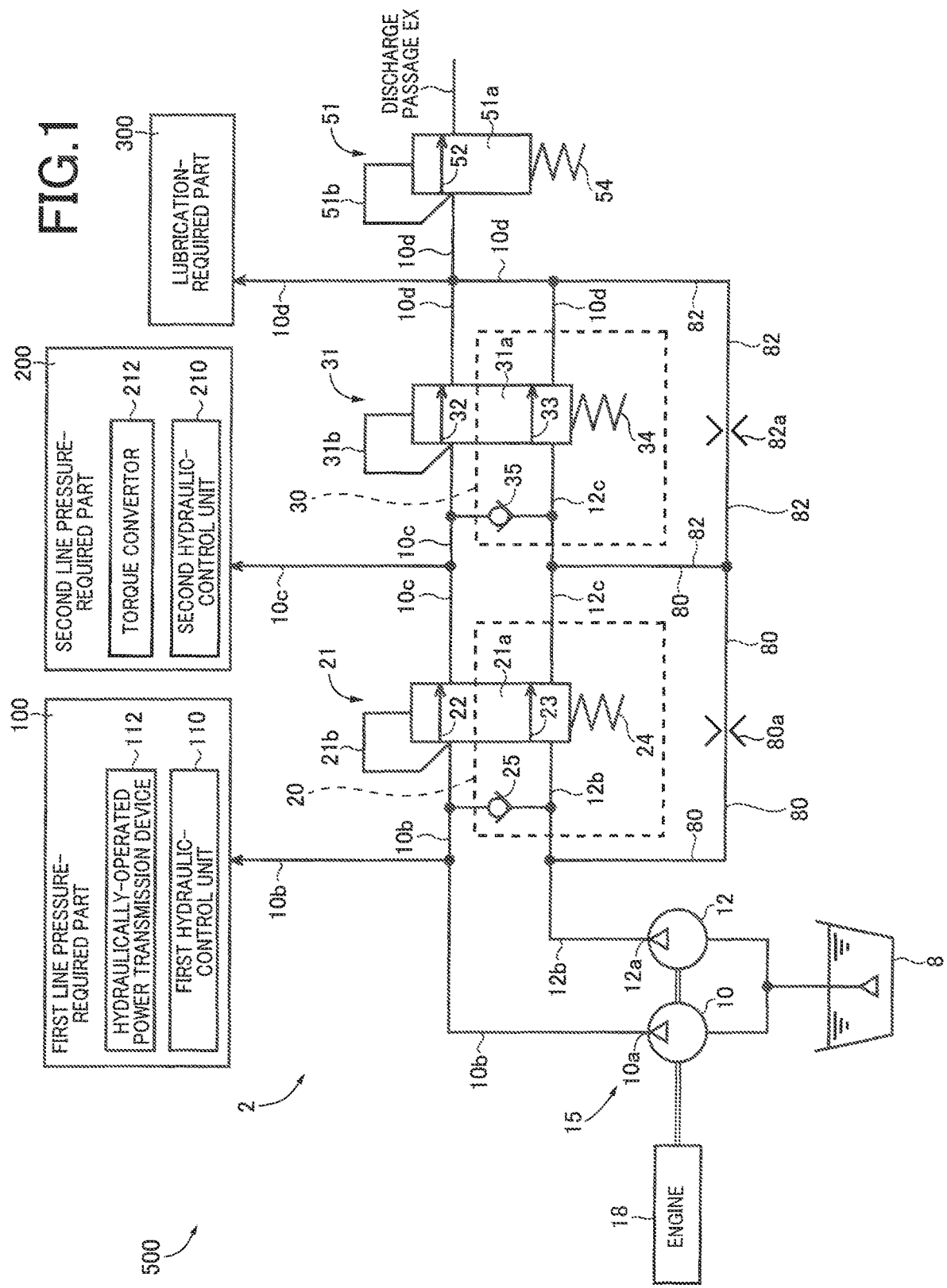
FIG. 1 is a view schematically showing a vehicle hydraulic system constructed according to a first embodiment of the invention.

FIG. 1 is a view schematically showing a vehicle hydraulic system 2 constructed according to an embodiment of the invention.

As shown in FIG. 1, the vehicle hydraulic system 2 is equipped with a hydraulic pump device 15 including a main pump 10 and a sub pump 12 that are to be driven by a drive force generated by an internal combustion engine 18 as a vehicle drive source provided in a vehicle 500 and configured to drive the vehicle 500. The main and sub pumps 10, 12 are configured to pump a working fluid (e.g., working oil) stored in a fluid reservoir in the form of an oil pan 8. Each of the main and sub pumps 10, 12 is constituted by, for example, a gear pump including pump gears to be rotated at a rotational speed that is dependent on a rotational speed Ne (rpm) of the engine 18, for ejecting the working fluid. Each of the pumps 10, 12 is a fixed-volume type pump in which a displacement volume of the working fluid per one rotation of the pump gears is constant so that a rate of ejection of the working fluid is dependent on a rotational speed of the pump gears. The main pump 10 has a first outlet port 10a, while the sub pump 12 has a second outlet port 12a.

The working fluid ejected from each of the main and sub pumps 10, 12 is supplied to a first line pressure-required part 100 via a first line passage 10b, to a second line pressure-required part 200 via a second line passage 10c, and to a lubrication-required part 300 via a lubricating passage 10d. The first line pressure-required part 100 includes a first hydraulic-control unit 110 configured to control hydraulically-operated power transmission devices 112 such as pulleys and clutches including respective hydraulic actuators. The second line pressure-required part 200 includes a second hydraulic-control unit 210 configured to control a torque convertor 212. The lubrication-required part 300 includes rotating members (e.g., gears) and supporting members (e.g., bearings) that are required to be lubricated. Among the first, second and third line pressure-required parts 100, 200, 300, the first line pressure-required part 100 requires a hydraulic pressure higher than the other two line pressure-required parts 200, 300. The second line pressure-required part 200 requires the second highest hydraulic pressure. The hydraulic pressure of the working fluid to be supplied to the lubrication-required part 300 may be the lowest. In the present embodiment, as described below, the hydraulic pressure in the first line passage 10b is regulated to a first line pressure value PL1 (Mpa), and the hydraulic pressure in the second line passage 10c is regulated to a second line pressure value PL2 (MPa) that is lower than the first line pressure value PL1. In the present embodiment, as described below, the hydraulic pressure in the first line passage 10b is regulated to the first line pressure value PL1 by a relief regulator valve, and the hydraulic pressure in the second line passage 10c is regulated to the second line pressure value PL2 by another relief regulator valve. In the pressure regulation by the relief regulator valve, a cracking pressure value, i.e., the pressure value upon initiation of opening of the regulator valve is different from a setting pressure value, i.e., the pressure value upon maximization of a rate of discharge of the working fluid from the regulator valve. That is, with increase and reduction of the rate of flow of the working fluid ejected from the hydraulic pump device 15, the value of the regulated hydraulic pressure is increased and reduced within a certain range. Thus, each of the relief regulator valves is configured to regulate the hydraulic pressure within a certain range. It is noted that the value of the hydraulic pressure regulated by each of the relief regulator valves is represented as if it were a constant value in FIG. 3 and FIG. 6, which will be referred below.

The first outlet port 10a of the main pump 10 is connected to the first line passage 10b, so that the working fluid ejected through the first outlet port 10a of the main pump 10 is supplied to the first line pressure-required part 100 via the first line passage 10b. Meanwhile, the second outlet port 12a of the sub pump 12 is connected to a sub-pump ejection passage 12b, so that the working fluid ejected through the second outlet port 12a of the sub pump 12 is supplied to the sub-pump ejection passage 12b. It is noted that the main pump 10 and the sub pump 12 correspond to respective "first and second pumps" as "two mechanically-operated hydraulic pumps", which are recited in the appended claims.

The first line passage 10b and the sub-pump ejection passage 12b are connected to a first regulator 21 serving as the relief regulator valve. The first regulator 21 is a pressure-relief-control valve including a first line-pressure-relief regulator valve 22 and a first flow-control valve 23 which cooperate with each other to constitute a first pair of valves. The first line-pressure-relief regulator valve 22 is provided to regulate the hydraulic pressure in the first line passage 10b, by allowing a part of the working fluid in the first line passage 10b to flow out to the second line passage 10c. The first flow-control valve 23 is provided to allow the working fluid ejected from the sub pump 12, to flow out to an intermediate connecting passage 12c, depending on increase of the hydraulic pressure in the first line passage 10b.

The first regulator 21 includes a spring 24 and a spool valve body 21a which is provided therein and which is constantly biased or forced by the spring 24 in a valve closing direction that causes the first line-pressure-relief regulator valve 22 and the first flow-control valve 23 to be closed. The first regulator 21 is provided with a feedback passage 21b that causes the hydraulic pressure in the first line passage 10b to act as a thrust force that forces the spool valve body 21a in a valve opening direction that is opposite to the above-described valve closing direction. Thus, a feedback hydraulic pressure, which is increased with increase of the hydraulic pressure in the first line passage 10b, acts on the spool valve body 21a through the feedback passage 21b whereby the spool valve body 21a is displaced against a biasing force of the spring 24 in the valve opening direction.

When the spool valve body 21a of the first regulator 21 is displaced in the valve opening direction by a very small amount, the first line-pressure-relief regulator valve 22 and the first flow-control valve 23 are both still closed. When the amount of displacement of the spool valve body 21a in the valve opening direction is increased with increase of the hydraulic pressure acting on the spool valve body 21a of the first regulator 21 through the feedback passage 21b, the first line-pressure-relief regulator valve 22 is first opened whereby the working fluid is caused to flow out from the first line passage 10b to the second line passage 10c, such that the hydraulic pressure in the first line passage 10b is regulated to the first line pressure value PL1. Then, when the hydraulic pressure in the first line passage 10b is further increased with increase of the rate of ejection of the working fluid by the main pump 10 which is caused by increase of the engine rotational speed Ne, the amount of displacement of the spool valve body 21a of the first regulator 21 in the valve opening direction is further increased so that the first flow-control valve 23 as well as the first line-pressure-relief regulator valve 22 is opened, whereby the rate of the flow of the working fluid from the first line passage 10b to the second line passage 10c through the first line-pressure-relief regulator valve 22 is further increased and also the working fluid is caused to flow out from the sub-pump ejection passage 12b to the intermediate connecting passage 12c through the first flow-control valve 23.

A first one-way valve 25 is provided between the first line passage 10b and the sub-pump ejection passage 12b. When the hydraulic pressure in the sub-pump ejection passage 12b is higher than the hydraulic pressure in the first line passage 10b, the first one-way valve 25 is opened to allow the working fluid to flow out from the sub-pump ejection passage 12b to the first line passage 10b. When the hydraulic pressure in the first line passage 10b is higher than the hydraulic pressure in the sub-pump ejection passage 12b, the first one-way valve 25 is closed to inhibit the working fluid from flowing out from the first line passage 10b to the sub-pump ejection passage 12b.

As described below, the first flow-control valve 23 and the first one-way valve 25 cooperate to constitute a first path-switching valve device 20.

A first bypass passage 80 is provided between the sub-pump ejection passage 12b and the intermediate connecting passage 12c, and bypasses the first flow-control valve 23 of the first path-switching valve device 20. The first bypass passage 80, which always maintains a communication between the sub-pump ejection passage 12b and the intermediate connecting passage 12c, is provided with a flow restrictor 80a such as a choke or an orifice, so as to provide a flow resistance higher than a flow resistance that acts on the working fluid, which flows through the first flow-control valve 23 between the sub-pump ejection passage 12b and the intermediate connecting passage 12c when the first flow-control valve 23 is opened. It is preferable that the flow resistance provided by the first bypass passage 80 is higher than a flow resistance that acts on the working fluid, which flows through the first one-way valve 25 between the sub-pump ejection passage 12b and the first line passage 10b when the first one-way valve 25 is opened, so that an amount of the working fluid, which is ejected by the sub pump 12 and supplied to the first line passage 10b when the first one-way valve 25 is opened, is larger than an amount of the working fluid which is ejected by the sub pump 12 and supplied to the intermediate connecting passage 12c through the first bypass passage 80.

The second line passage 10c and the intermediate connecting passage 12c are connected a second regulator 31 serving as the relief regulator valve. The second regulator 31 is a pressure-relief-control valve including a second line-pressure-relief regulator valve 32 and a second flow-control valve 33 which cooperate with each other to constitute a second pair of valves. The second line-pressure-relief regulator valve 32 is provided to regulate the hydraulic pressure in the second line passage 10c, by allowing a part of the working fluid in the second line passage 10c to flow out to the lubricating passage 10d. The second flow-control valve 33 is provided to allow the working fluid in the intermediate connecting passage 12c, to flow out to the lubricating passage 10d, depending on increase of the hydraulic pressure in the second line passage 10c.

The second regulator 31 has substantially the same construction as the first regulator 21. That is, the second regulator 31 includes a spring 34 and a spool valve body 31a which is provided therein and which is constantly biased or forced by the spring 34 in a valve closing direction that causes the second line-pressure-relief regulator valve 32 and the second flow-control valve 33 to be closed. The second regulator 31 is provided with a feedback passage 31b that causes the hydraulic pressure in the second line passage 10c to act as a thrust force that forces the spool valve body 31a in a valve opening direction that is opposite to the above-described valve closing direction. When the thrust force based on the hydraulic pressure acting on the spool valve body 31a through the feedback passage 31b is larger than a biasing force of the spring 34 acting in the valve closing direction, the spool valve body 31a is displaced in the valve opening direction.

When the spool valve body 31a of the second regulator 31 is displaced in the valve opening direction by a very small amount, the second line-pressure-relief regulator valve 32 and the second flow-control valve 33 are both still closed. When the amount of displacement of the spool valve body 31a in the valve opening direction is increased with increase of the hydraulic pressure acting on the spool valve body 31a of the second regulator 31 through the feedback passage 31b, the second line-pressure-relief regulator valve 32 is first opened whereby the working fluid is caused to flow out from the second line passage 10c to the lubricating passage 10d, such that the hydraulic pressure in the second line passage 10c is regulated to the second line pressure value PL2. Then, when the hydraulic pressure in the second line passage 10c is further increased with increase of the rate of ejection of the working fluid by the main pump 10 which is caused by increase of the engine rotational speed Ne, the amount of displacement of the spool valve body 31a of the second regulator 31 in the valve opening direction is further increased so that the second flow-control valve 33 as well as the second line-pressure-relief regulator valve 32 is opened, whereby the rate of the flow of the working fluid from the second line passage 10c to the lubricating passage 10d through the second line-pressure-relief regulator valve 32 is further increased and also the working fluid is caused to flow out from the intermediate connecting passage 12c to the lubricating passage 10d through the second flow-control valve 33.

A second one-way valve 35 is provided between the second line passage 10c and the intermediate connecting passage 12c. When the hydraulic pressure in the intermediate connecting passage 12c is higher than the hydraulic pressure in the second line passage 10c, the second one-way valve 35 is opened to allow the working fluid to flow out from the intermediate connecting passage 12c to the second line passage 10c. When the hydraulic pressure in the second line passage 10c is higher than the hydraulic pressure in the intermediate connecting passage 12c, the second one-way valve 35 is closed to inhibit the working fluid from flowing out from the second line passage 10c to the intermediate connecting passage 12c.

As described below, the second flow-control valve 33 and the second one-way valve 35 cooperate to constitute a second path-switching valve device 30.

A second bypass passage 82 is provided between the intermediate connecting passage 12c and the lubricating passage 10d, and bypasses the second flow-control valve 33 of the second path-switching valve device 30. The second bypass passage 82, which always maintains a communication between the intermediate connecting passage 12c and the lubricating passage 10d, is provided with a flow restrictor 82a such as a choke or an orifice, so as to provide a flow resistance higher than a flow resistance that acts on the working fluid, which flows through the second flow-control valve 33 between the intermediate connecting passage 12c and the lubricating passage 10d when the second flow-control valve 33 is opened. It is preferable that the flow resistance provided by the second bypass passage 82 is higher than a flow resistance that acts on the working fluid, which flows through the second one-way valve 35 between the intermediate connecting passage 12c and the second line passage 10c when the second one-way valve 35 is opened, so that an amount of the working fluid, which is ejected by the sub pump 12 and supplied to the second line passage 10c when the second one-way valve 35 is opened, is larger than an amount of the working fluid which is ejected by the sub pump 12 and supplied to the lubricating passage 10d through the second bypass passage 82.

The lubricating passage 10d is connected to a lubricant-pressure regulator 51 serving as a relief regulator valve. The lubricant-pressure regulator 51 includes a lubricant-pressure-relief regulator valve 52, which is provided to regulate the hydraulic pressure in the lubricating passage 10d, by allowing a part of the working fluid in the lubricating passage 10d to flow out to a discharge passage (drain) EX.

The lubricant-pressure regulator 51 includes a spring 54 and a spool valve body 51a which is provided therein and which is constantly biased or forced by the spring 54 in a valve closing direction that causes the lubricant-pressure-relief regulator valve 52 to be closed. The lubricant-pressure regulator 51 is provided with a feedback passage 51b that causes the hydraulic pressure in the lubricating passage 10d to act on the spool valve body 51a in a valve opening direction that is opposite to the above-described valve closing direction. The hydraulic pressure acting on the spool valve body 51a through the feedback passage 51b is increased with increase of the hydraulic pressure in the lubricating passage 10d. When a thrust force based on the hydraulic pressure acting on the spool valve body 51a through the feedback passage 51b is larger than a biasing force of the spring 54 acting in the valve closing direction, the spool valve body 51a is displaced in the valve opening direction against a biasing force of the spring 54. With the spool valve body 51a being placed in the valve opening direction, the hydraulic pressure in the lubricating passage 10d is regulated to a lubricant pressure value PL3 (MPa) that is lower than the second line pressure value PL2. The lubricating passage 10d as well as the second line passage 10c is located on a downstream side of the first line passage 10b in a direction of flow of the working fluid, and cooperates with the second line passage 10c to constitutes "a downstream-side passage" recited in the appended claims.

When the spool valve body 51a of the lubricant-pressure regulator 51 is displaced in the valve opening direction by a very small amount, the lubricant-pressure-relief regulator valve 52 is still closed. When the amount of displacement of the spool valve body 51a in the valve opening direction is increased with increase of the hydraulic pressure acting on the spool valve body 51a of the lubricant-pressure regulator 51 through the feedback passage 51b, the lubricant-pressure-relief regulator valve 52 is opened whereby the working fluid is caused to flow out from the lubricating passage 10d to the discharge passage EX. The working fluid, which is thus discharged to the discharge passage EX, is returned to the oil pump 8.

Figure 2:
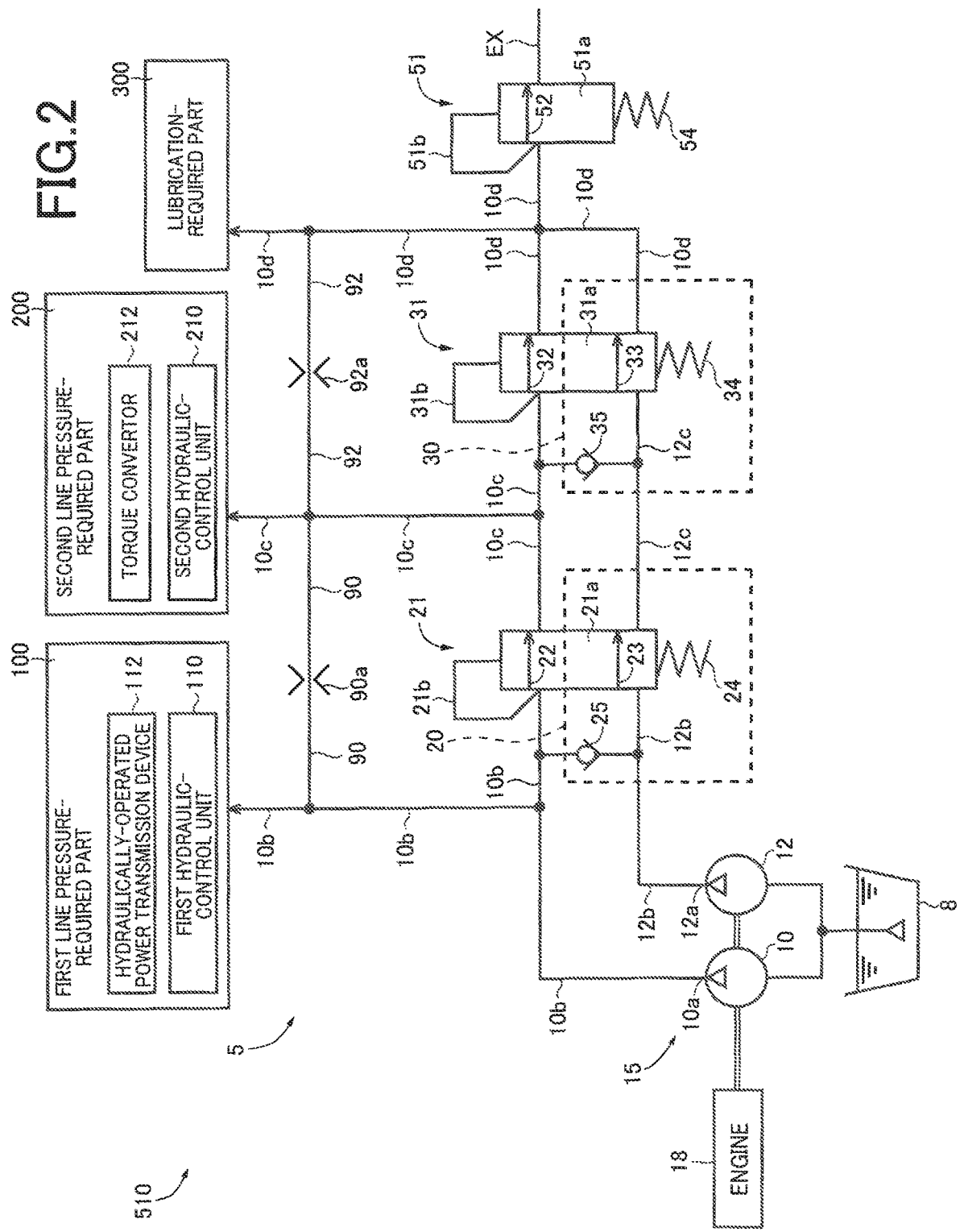
FIG. 2 is a view schematically showing a vehicle hydraulic system of a first comparative example.

FIG. 2 is a view schematically showing a vehicle hydraulic system 5 of a first comparative example. This vehicle hydraulic system 5, which is to be installed on a vehicle 510, has substantially the same as the vehicle hydraulic system 2 of the first embodiment, but is different from the vehicle hydraulic system 2 in terms of positions of first and second bypass passages 90, 92 that are provided with respective flow restrictors 90a, 92a. In the following description of this first comparative example, the same reference signs as used in the description of the first embodiment will be used to identify the functionally corresponding parts, and descriptions thereof are not provided. In the vehicle hydraulic system 5, the first bypass passage 80 is not provided between the sub-pump ejection passage 12b and the intermediate connecting passage 12c, and the second bypass passage 82 is not provided between the intermediate connecting passage 12c and the lubricating passage 10d. In the vehicle hydraulic system 5, the first bypass passage 90 is provided between the first line passage 10b and the second line passage 10c, and the second bypass passage 92 is provided between the second line passage 10c and the lubricating passage 10d.

Figure 3:
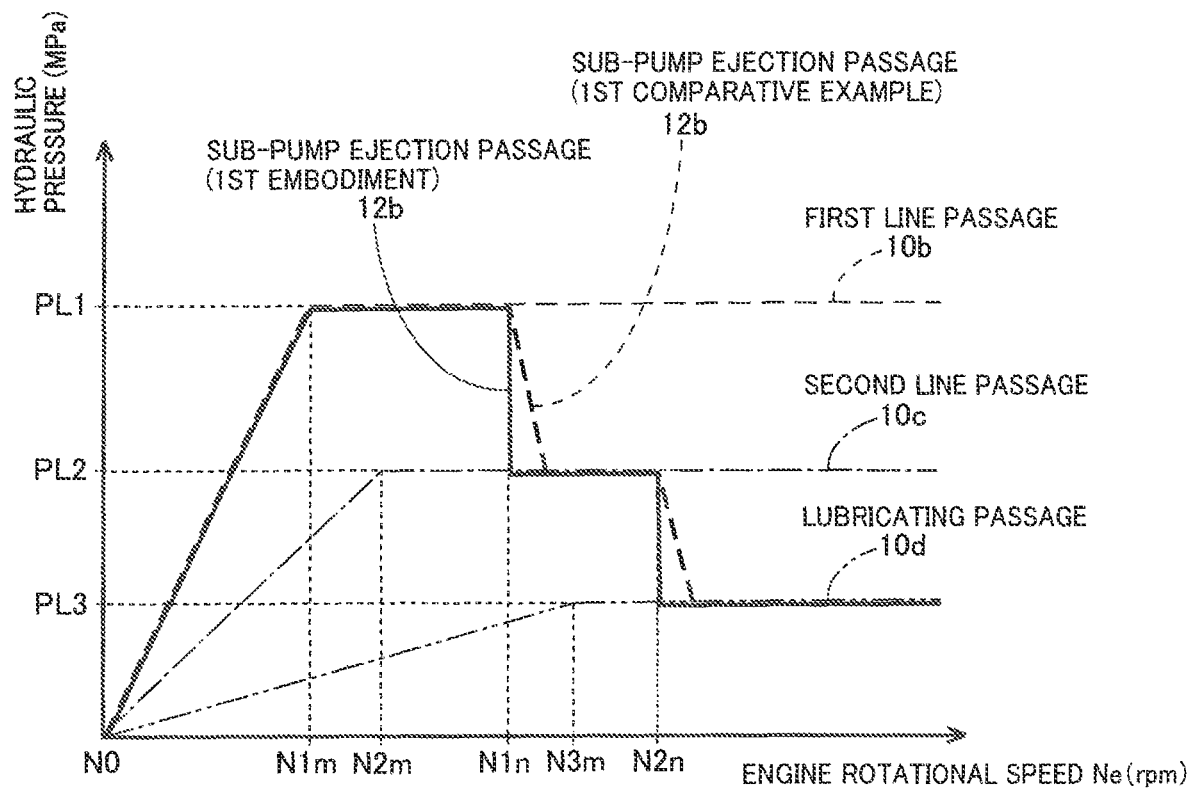
FIG. 3 is a view showing a relationship between an engine rotational speed and a hydraulic pressure in a sub-pump ejection passage of the vehicle hydraulic system of FIG. 1.

FIG. 3 is a view showing a relationship between the engine rotational speed Ne and the hydraulic pressure in the sub-pump ejection passage 12b of the vehicle hydraulic system 2 shown in FIG. 1, together with a relationship between the engine rotational speed Ne and the hydraulic pressure in the sub-pump ejection passage 12b of the vehicle hydraulic system 5 of the first comparative example shown in FIG. 2. In FIG. 3, the abscissa represents the engine rotational speed Ne while the ordinate represents the hydraulic pressure in the sub-pump ejection passage 12b. It is noted that the first embodiment and the first comparative example are substantially the same as each other in terms of a relationship between the engine rotational speed Ne and the hydraulic pressure in the first line passage 10b (which is indicated by thin broken line in FIG. 3), a relationship between the engine rotational speed Ne and the hydraulic pressure in the second line passage 10c (which is indicated by thin one-dot chain line in FIG. 3) and a relationship between the engine rotational speed Ne and the hydraulic pressure in the lubricating passage 10d (which is indicated by thin two-dot chain line in FIG. 3). Described more precisely, as described below, the load of the main pump 10 in the first comparative example is larger than in the first embodiment, so that an initial rise of the hydraulic pressure in the first line passage 10b takes place later in the first comparative example than in the first embodiment. However, in FIG. 3, the relationship between the engine rotational speed Ne and the hydraulic pressure in the first line passage 10b in the first comparative example is represented as if it were the same as that in the first embodiment, for easier understanding.

Regarding FIG. 3, the relationship between the engine rotational speed Ne and the hydraulic pressure in each of the passages 10*b*, 10*c*, 10*d* of the vehicle hydraulic system 2 of the first embodiment will be first described. Then, the corresponding relationship in the vehicle hydraulic system 5 of the first comparative example will be described.

In a state in which the engine rotational speed Ne is lower than N1*m* (rpm), namely, in which the rotational speed of the pump gears of each of the main and sub pumps 10, 12 is low, the hydraulic pressure in the first line passage 10*b*, to which the working fluid is pumped from the main and sub pumps 10, 12, is very low. Therefore, the hydraulic pressure acting on the spool valve body 21*a* of the first regulator 21 through the feedback passage 21*b* is so low that the first line-pressure-relief regulator valve 22 and the first flow-control valve 23 of the first regulator 21 are both closed. Similarly, the second line-pressure-relief regulator valve 32 and the second flow-control valve 33 of the second regulator 31 are both closed, and the lubricant-pressure-relief regulator valve 52 of the lubricant-pressure regulator 51 is closed. In FIG. 3, a range N0-N1*m* of the engine rotational speed Ne corresponds to this state.

In this state, a part of the working fluid ejected from the sub pump 12 flows out to the intermediate connecting passage 12*c* through the first bypass passage 80. Since the first bypass passage 80 is designed to provide a relatively high flow resistance, the hydraulic pressure in the sub-pump ejection passage 12*b* is made higher than the hydraulic pressure in the first line passage 10*b*. When the hydraulic pressure in the sub-pump ejection passage 12*b* is higher than the hydraulic pressure in the first line passage 10*b*, the first one-way valve 25 is opened whereby the working fluid ejected from the sub pump 12 flows out to the first line passage 10*b* through the first one-way valve 25. Then, the working fluid ejected from the main pump 10 and the working fluid ejected from the sub pump 12 are both supplied to the first line pressure-required part 100 through the first line passage 10*b*.

As described above, a part of the working fluid, which has been ejected from the sub pump 12 to the sub-pump ejection passage 12*b*, flows out to the intermediate connecting passage 12*c* through the first bypass passage 80. Then, a part of the working fluid, which has been flowing into the intermediate connecting passage 12*c*, flows out to the lubricating passage 10*d* through the second bypass passage 82. However, since the second bypass passage 82 is designed to provide a relatively higher flow resistance, the hydraulic pressure in the intermediate connecting passage 12*c* is gradually increased. When the hydraulic pressure in the intermediate connecting passage 12*c* becomes higher than the hydraulic pressure in the second line passage 10*c*, the second one-way valve 35 is opened whereby the working fluid in the intermediate connecting passage 12*c* flows out to the second line passage 10*c*. The working fluid, which has been flowing into the second line passage 10*c* from the intermediate connecting passage 12*c*, is supplied to the second line pressure-required part 200.

As described above, a part of the working fluid in the intermediate connecting passage 12*c* flows out to the lubricating passage 10*d* through the second bypass passage 82. The working fluid, which has been flowing into the lubricating passage 10*d* from the intermediate connecting passage 12*c*, is supplied to the lubrication-required part 300.

As shown in FIG. 3, in the range N0-N1*m* of the engine rotational speed Ne, the hydraulic pressures in the respective first line passage 10*b*, second line passage 10*c* and lubricating passage 10*d* are gradually increased with increase of the engine rotational speed Ne. It is noted that a rate of increase of the hydraulic pressure to the engine rotational speed Ne is higher in the first line passage 10*b* than in the second line passage 10*c* and in the lubricating passage 10*d*, and is smaller in the lubricating passage 10*d* than in the first line passage 10*b* and in the second line passage 10*c*, as shown in FIG. 3.

When the hydraulic pressure in the first line passage 10*b* reaches the first line pressure value PL1 with the engine rotational speed Ne being increased to N1*m* (rpm), the first line-pressure-relief regulator valve 22 starts to be opened, so that the working fluid starts to flow out to the second line passage 10*c* from the first line passage 10*b* whereby the hydraulic pressure in the first line passage 10*b* is regulated to the first line pressure value PL1. That is, the hydraulic pressure in the first line passage 10*b* is held in the first line pressure value PL1 as the regulated pressure value even after the engine rotational speed Ne is increased to be higher than N1*m*.

When the hydraulic pressure in the second line passage 10*c* reaches the second line pressure value PL2 (that is lower than the first line pressure value PL1) with the engine rotational speed Ne being increased to N2*m* (rpm) that is higher than N1*m*, the second line-pressure-relief regulator valve 32 starts to be opened, so that the working fluid starts to flow out to the lubricating passage 10*d* from the second line passage 10*c* whereby the hydraulic pressure in the second line passage 10*c* is regulated to the second line pressure value PL2. That is, the hydraulic pressure in the second line passage 10*c* is held in the second line pressure value PL2 as the regulated pressure value even after the engine rotational speed Ne is increased to be higher than N2*m*.

When the engine rotational speed Ne reaches N1*n* (rpm) that is higher than N1*m* and N2*m*, the hydraulic pressure in the first line passage 10*b* is further increased and accordingly the amount of displacement of the spool valve body 21*a* of the first regulator 21 in the valve opening direction is further increased whereby the first flow-control valve 23 is opened with a delay relative to the opening of the first line-pressure-relief 22, which started when the engine rotational speed Ne reaches N1*m* as described above. With the first flow-control valve 23 being opened, the working fluid starts to flow out to the intermediate connecting passage 12*c* from the sub-pump ejection passage 12*b*, and the hydraulic pressure in the sub-pump ejection passage 12*b* becomes smaller than the hydraulic pressure in the first line passage 10*b* whereby the first one-way valve 25 is closed. Therefore, a supply path of the working fluid ejected from the sub pump 12 to the sub-pump ejection passage 12*b* is switched except the part being supplied to the intermediate connecting passage 12*c* through the first bypass passage 80. Described specifically, the part of the working fluid, which has been flowing into the first line passage 10*b* through the first one-way valve 25 until the first flow-control valve 23 and the first one-way valve 25 are opened and closed, respectively, starts to flow out to the intermediate connecting passage 12*c* through the first flow-control valve 23. Thus, the first path-switching valve device 20, which includes the first flow-control valve 23 and the first one-way valve 25, for example, serves as a first supply-path switcher that is configured to switch the supply path of the working fluid ejected from the sub pump 12. As shown in FIG. 3, when the engine rotational speed Ne is a range from N0 to N1*n*, the hydraulic pressure in the sub-pump ejection passage 12*b* (which is indicated by thick solid line in FIG. 3) is substantially equal to the hydraulic pressure in the first line passage 10*b* (which is indicated by thin broken line in FIG. 3). However, after the engine rotational speed Ne has reached to N1*n*, the hydraulic pressure in the sub-pump ejection passage 12*b* (which is indicated by thick solid line in FIG. 3) becomes substantially equal to the hydraulic pressure in the second line passage 10*c* (which is indicated by thin one-dot chain line in FIG. 3). A stage at which the engine rotational speed Ne is N1*n*, namely, at which the first flow-control valve 23 is opened, corresponds to a stage at which the hydraulic pressure in the first line passage 10*b* is "a first predetermined pressure value" that is recited in the appended claims. The first regulator 21 is designed such that a sufficient rate of supply of the working fluid to the first line pressure-required part 100 can be ensured by only the working fluid ejected from the main pump 10 when the engine rotational speed Ne is not lower higher than N1*n*. That is, the first regulator 21 is designed such that the first flow-control valve 23 is opened when the engine rotational speed Ne is N1*n*.

When the hydraulic pressure in the lubricating passage 10*d* reaches the lubricant pressure value PL3 (that is lower than the second line pressure value PL2) with the engine rotational speed Ne being increased to N3*m* (rpm) that is higher than N2*m* and N1*n*, the lubricant-pressure-relief regulator valve 52 is open so that the working fluid flows out to the discharge passage EX from the lubricating passage 10*d* whereby the hydraulic pressure in the lubricating passage 10*d* is regulated to the lubricant pressure value PL3. That is, the hydraulic pressure in the lubricating passage 10*d* is held in the lubricant pressure value PL3 as the regulated pressure value even after the engine rotational speed Ne is increased to be higher than N3*m*.

When the engine rotational speed Ne reaches N2*n* (rpm) that is higher than N1*n* and N3*m*, the hydraulic pressure in the second line passage 10*c* is further increased and accordingly the amount of displacement of the spool valve body 31*a* of the second regulator 31 in the valve opening direction is further increased whereby the second flow-control valve 33 is opened with a delay relative to the opening of the second line-pressure-relief 32, which started when the engine rotational speed Ne reaches N2*m* as described above. With the second flow-control valve 33 being opened, the working fluid starts to flow out to the lubricating passage 10*d* from the intermediate connecting passage 12*c*, and the hydraulic pressure in the intermediate connecting passage 12*c* becomes smaller than the hydraulic pressure in the second line passage 10*c* whereby the second one-way valve 35 is closed. Therefore, a supply path of the working fluid ejected from the sub pump 12 to the sub-pump ejection passage 12*b* is switched except the part being supplied to the lubricating passage 10*d* through the second bypass passage 82. Described specifically, the part of the working fluid, which has been flowing into the second line passage 10*c* through the second one-way valve 35 until the second flow-control valve 33 and the second one-way valve 35 are opened and closed, respectively, starts to flow out to the lubricating passage 10*d* through the second flow-control valve 33. Thus, the second path-switching valve device 30, which includes the second flow-control valve 33 and the second one-way valve 35, for example, serves as a second supply-path switcher that is configured to switch the supply path of the working fluid ejected by the sub pump 12. As shown in FIG. 3, when the engine rotational speed Ne is a range from N1*n* to N2*n*, the hydraulic pressure in the sub-pump ejection passage 12*b* (which is indicated by thick solid line in FIG. 3) is substantially equal to the hydraulic pressure in the second line passage 10*c* (which is indicated by thin one-dot chain line in FIG. 3). However, after the engine rotational speed Ne has reached to N2*n*, the hydraulic pressure in the sub-pump ejection passage 12*b* (which is indicated by thick solid line in FIG. 3) becomes substantially equal to the hydraulic pressure in the lubricating passage 10*d* (which is indicated by thin two-dot chain line in FIG. 3). A stage at which the engine rotational speed Ne is N2*n*, namely, at which the second flow-control valve 33 is opened, corresponds to a stage at which the hydraulic pressure in the second line passage 10*c* is "a second predetermined pressure value" that is recited in the appended claims. The second regulator 31 is designed such that a sufficient rate of supply of the working fluid to the first line pressure-required part 100 and the second line pressure-required part 200 can be ensured by only the working fluid ejected from the main pump 10 when the engine rotational speed Ne is not lower higher than N2*n*. That is, the second regulator 31 is designed such that the second flow-control valve 33 is opened when the engine rotational speed Ne is N2*n*.

As described above, in the vehicle hydraulic system 2, when the hydraulic pressure in each of the first line passage 10*b* and the second line passage 10*c* is increased with increase of the ejection capacity of the main pump 10 which is caused by increase of the engine rotational speed Ne, the supply path of the working fluid ejected from the sub pump 12 is automatically switched. Depending on the increase of the ejection capacity of the main pump 10, a supply destination to which the working fluid ejected from the sub pump 12 is to be supplied is automatically switched from the high-hydraulic-pressure required part to the low-hydraulic-pressure required part. Owing to the switching of the supply destination, the load of the sub pump 12 is reduced.

On the other hand, in the vehicle hydraulic system 5 of the first comparative example, the working fluid ejected from the main pump 10 always flows out to the second line passage 10*c* and the lubricating passage 10*d* through the first and second bypass passages 90, 92, so that an amount of consumption of the working fluid is large. That is, when the engine rotational speed Ne is in the vicinity of N1*n*, the working fluid ejected from the main pump 10 is supplied not only to the first line pressure-required part 100, but also to the second line pressure-required part 200 and the lubrication-required part 300 through the first and second bypass passages 90, 92. Therefore, the load of the main pump 10 is larger in the first comparative example than in the first embodiment. Further, when the engine rotational speed Ne is in the vicinity of N2*n*, the working fluid ejected from the main pump 10 is supplied not only to the first line pressure-required part 100 and second line pressure-required part 200 but also to the lubrication-required part 300 through the second bypass passage 92. Thus, the load of the main pump 10 is larger in the first comparative example than in the first embodiment.

Therefore, as compared with in the first comparative example, in the first embodiment, the load of the main pump 10 is smaller so that each of the spool valve bodies 21*a*, 31*a* of the respective first and second regulators 21, 31 is easily displaced in the valve opening direction with increase of the engine rotational speed Ne. As shown in FIG. 3, in the first embodiment, upon opening of the first flow-control valve 23 when the engine rotational speed Ne is N1*n* and upon opening of the second flow-control valve 33 when the engine rotational speed Ne is N2*n*, the hydraulic pressure in the sub-pump ejection passage 12*b* (which is indicated by thick solid line in FIG. 3) is quickly reduced in response to increase of the engine rotational speed Ne. On the other hand, in the first comparative example, as compared with in the first embodiment, the load of the main pump 10 is larger so that each of the spool valve bodies 21*a*, 31*a* of the respective first and second regulators 21, 31 is not easily displaced in the valve opening direction with increase of the engine rotational speed Ne. As shown in FIG. 3, in the first comparative example, upon opening of the first flow-control valve 23 when the engine rotational speed Ne is N1n and upon opening of the second flow-control valve 33 when the engine rotational speed Ne is N2n, the hydraulic pressure in the sub-pump ejection passage 12b (which is indicated by thick broken line in FIG. 3) is slowly reduced in response to increase of the engine rotational speed Ne.

Since the second outlet port 12a of the sub pump 12 is connected to the sub-pump ejection passage 12b, the reduction of the hydraulic pressure in the sub-pump ejection passage 12b means reduction of the load of the sub pump 12. Therefore, as compared with in the sub pump 12 in the first comparative example, in the sub pump 12 in the first embodiment, the load of the sub pump 12 is quickly reduced when the supply path of the working fluid is switched by increase of the engine rotational speed Ne.

In the vehicle hydraulic system 2 of the first embodiment, when the engine rotational speed Ne is higher than N2n, the working fluid ejected from the sub pump 12 is supplied to the lubrication-required part 300 through the first flow-control valve 23 of the first path-switching valve device 20, the second flow-control valve 33 of the second path-switching valve device 30 and the lubricating passage 10d. When the engine rotational speed Ne is higher than N1n and lower than N2n, the working fluid ejected from the sub pump 12 is supplied to the lubrication-required part 300 through the first flow-control valve 23 of the first path-switching valve device 20, the second bypass passage 82 and the lubricating passage 10d. When the engine rotational speed Ne is lower than N1n, the working fluid ejected from the sub pump 12 is supplied to the lubrication-required part 300 through the first and second bypass passages 80, 82 and the lubricating passage 10d. Irrespective of whether the engine rotational speed Ne is high or low, the working fluid is supplied from the sub pump 12 to the second line passage 10c and the lubricating passage 10d, so that the load of the main pump 10 is reduced. Further, with increase of the engine rotational speed Ne, the supply destination of the working fluid supplied from the sub pump 12 is automatically switched from the first line passage 10b to the second line passage 10c, then, from the second line passage 10c to the lubricating passage 10d, namely, is automatically switch from a relatively high hydraulic-pressure passage to a relatively low hydraulic-pressure passage. It is therefore possible to avoid increase of size of the main pump 10 or possible to reduce the load of the sub pump 12 and accordingly to improve the fuel economy of the vehicle 500 including the engine 18 that drives the sub pump 12.

In the vehicle hydraulic system 2 of the first embodiment, when the supply path of the working fluid ejected from the sub pump 12 is switched by opening of each of the first and second flow-control valves 23, 33 which is caused by increase of the engine rotational speed Ne, the hydraulic pressure in the sub-pump ejection passage 12b is quickly reduced in response to the increase of the engine rotational speed Ne. Therefore, as compared with in the first comparative example, in the first embodiment, the load of the sub pump 12 is quickly reduced with the increase of the engine rotational speed Ne, so that it is possible to improve the fuel economy of the vehicle 500 including the engine 18 that drives the sub pump 12.

In the vehicle hydraulic system 2 of the first embodiment, at a stage at which the engine rotational speed Ne becomes so high that the supply of the working fluid to any of the first and second line pressure-required parts 100, 200 and the lubrication-required part 300 can be made by only the working fluid ejected from the main pump 10, the consumption of the working fluid ejected from the main pump 10 due to the outflow through the first and second bypass passages 90, 92, which is caused in the first comparative example, is not caused. Thus, in the first embodiment, the main pump 10 is not required to have an increased ejection capacity for compensating such a consumption of the working fluid flowing out through the first and second bypass passages 90, 92, and accordingly the main pump 10 does not required to be made large in size.

In the vehicle hydraulic system 2 of the first embodiment, owing to the operations of the first flow-control valve 23 and the first one-way valve 25 and the operations of the second flow-control valve 33 and the second one-way valve 35, the supply path of the working fluid ejected from the sub pump 12 is automatically switched in response to increase of the hydraulic pressure in each of the first and second line passages 10b, 10c which is caused by increase of the ejection capacity of the main pump 10.

In the vehicle hydraulic system 2 of the first embodiment, a supply path of the working fluid from the first line passage 10b to the second line passage 10c is automatically established by operation of the first line-pressure-relief regulator valve 22. This arrangement makes it possible to restrain an excessive increase of the hydraulic pressure in the first line passage 10b, and to effectively utilize an excess of the hydraulic pressure in the first line passage 10b for increasing the hydraulic pressure in the second line passage 10c. Similarly, a supply path of the working fluid from the second line passage 10c to the lubricating passage 10d is automatically established by operation of the second line-pressure-relief regulator valve 32. This arrangement makes it possible to restrain an excessive increase of the hydraulic pressure in the second line passage 10c, and to effectively utilize an excess of the hydraulic pressure in the second line passage 10c for increasing the hydraulic pressure in the lubricating passage 10d. In the vehicle hydraulic system 2 of the first embodiment, the first bypass passage 80 provides the flow resistance higher than the flow resistance that acts on the working fluid flowing through the first flow-control valve 23 between the second outlet port 12a and the intermediate connecting passage 12c, and the second bypass passage 82 provides the flow resistance higher than the flow resistance that acts on the working fluid flowing through the second flow-control valve 33 between the intermediate connecting passage 12c and the lubricating passage 10d. Owing to these arrangements, when the ejection capacity of the sub pump 12 is low with the engine rotational speed Ne being lower than N1n, the supply of the working fluid ejected from the sub pump 12 to the second line passage 10c or the lubricating passage 10d is made, while being limited by a certain degree that is dependent on the high flow resistance of the first and second bypass passages 80, 82. When the ejection capacity of the sub pump 12 is high with the engine rotational speed Ne being higher than N2n, the supply of the working fluid ejected from the sub pump 12 to the lubricating passage 10d is made, while being limited by a small degree which is dependent on the small flow resistance of the first and second flow-control valves 23, 33 and which is smaller than the above-described certain degree. That is, the supply of the working fluid ejected from the sub pump 12 to the second line passage 10c or the lubricating passage 10d is increased with increase of the ejection capacity of the sub pump 12.

In the vehicle hydraulic system 2 of the first embodiment, the working fluid in the first line passage 10b is supplied to the first line pressure-required part 100 that includes the first hydraulic-control unit 110 configured to control the hydraulically-operated power transmission devices 112 such as pulleys and clutches including respective hydraulic actuators, the working fluid in the second line passage 10c is supplied to the second line pressure-required part 200 that includes the second hydraulic-control unit 210 configured to control the torque convertor 212, and the working fluid in the lubricating passage 10d is supplied to the lubrication-required part 300 so as to lubricate the lubrication-required part 300. Thus, the working fluid is supplied to each of the first hydraulic-control unit 110 configured to control the hydraulically-operated power transmission devices 112, the second hydraulic-control unit 210 configured to control the torque convertor 212 and the lubrication-required part 300, with the hydraulic pressure having a value suitable for a corresponding one of the first and second hydraulic-control units 110, 210 and lubrication-required part 300.

In the vehicle hydraulic system 2 of the first embodiment, the first flow-control valve 23 and the first line-pressure-relief regulator valve 22 are both provided in a single pressure-relief-control valve in the form of the first regulator 21, and the second flow-control valve 33 and the second line-pressure-relief regulator valve 32 are both provided in another single pressure-relief-control valve in the form of the second regulator 31. Thus, the vehicle hydraulic system can be made compact in size with a reduced number of components.

In the vehicle hydraulic system 2 of the first embodiment, owing to the lubricant-pressure-relief regulator valve 52 that is provided to discharge the working fluid in the lubricating passage 10d to the discharge passage EX, it is possible to restrain excessive increase of the hydraulic pressure in the lubricating passage 10d.

Second Embodiment

Figure 4:
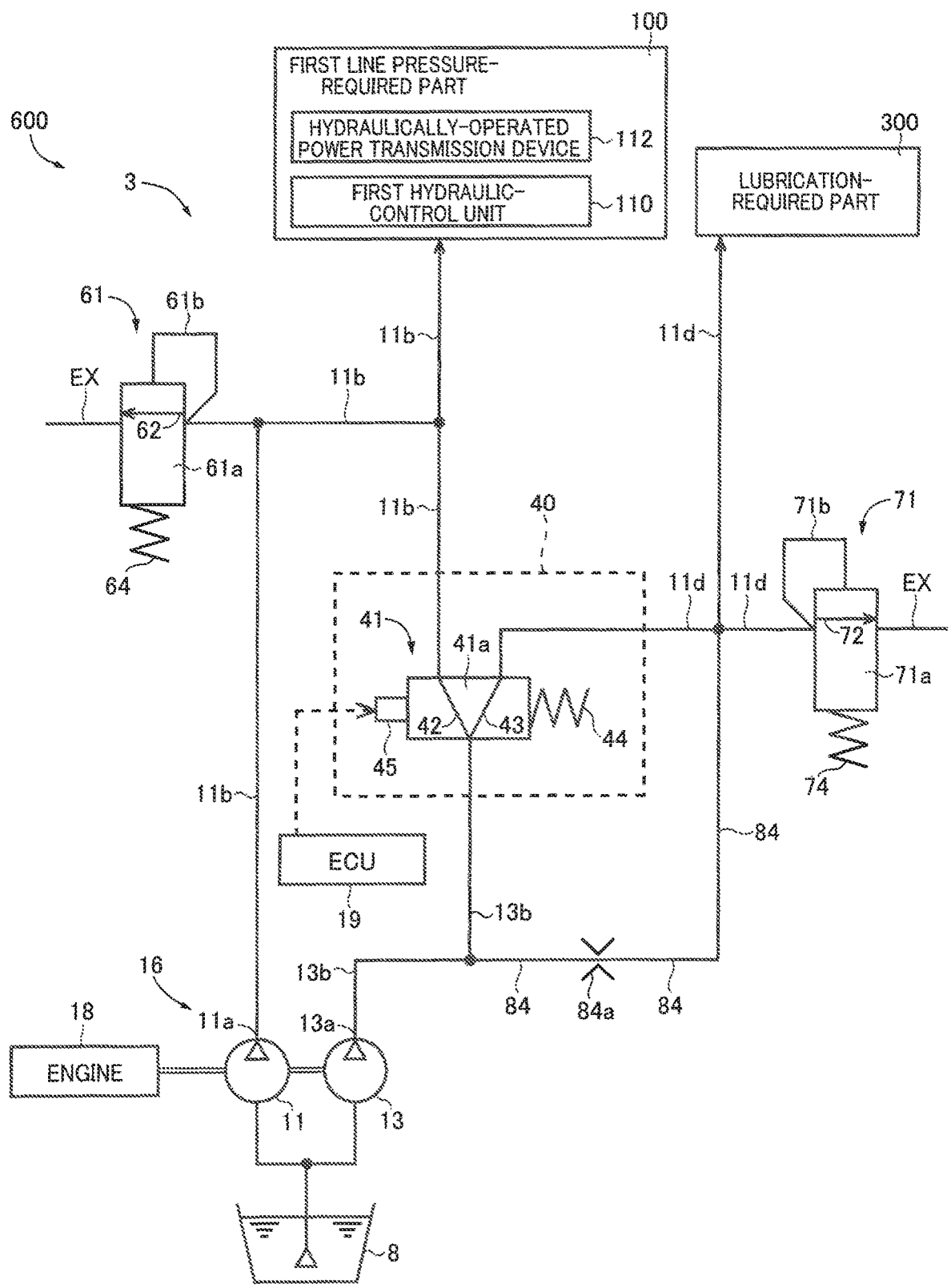
FIG. 4 is a view schematically showing a vehicle hydraulic system constructed according to a second embodiment of the invention.

FIG. 4 is a view schematically showing a vehicle hydraulic system 3 constructed according to a second embodiment of the invention. In the following description of this second embodiment, the same reference signs as used in the description of the first embodiment will be used to identify the functionally corresponding parts, and descriptions thereof are not provided.

As shown in FIG. 4, the vehicle hydraulic system 3 is equipped with a hydraulic pump device 16 including a main pump 11 and a sub pump 13 that are to be driven by a drive force generated by the internal combustion engine 18 as a vehicle drive source provided in a vehicle 600 and configured to drive the vehicle 600. The main and sub pumps 11, 13 are configured to pump a working fluid (e.g., working oil) stored in the oil pan 8. The main and sub pumps 11, 13 are identical with the respective main and sub pumps 10, 12 in the first embodiment. The main pump 11 has a first outlet port 11a, while the sub pump 13 has a second outlet port 13a. It is noted that the main pump 11 and the sub pump 13 correspond to respective "first and second pumps" as "two mechanically-operated hydraulic pumps", which are recited in the appended claims.

The working fluid ejected from each of the main and sub pumps 11, 13 is supplied to the first line pressure-required part 100 via a first line passage 11b, and to the lubrication-required part 300 via a lubricating passage 11d. The first line pressure-required part 100 includes the first hydraulic-control unit 110 configured to control the hydraulically-operated power transmission devices 112 such as the pulleys and clutches including the respective hydraulic actuators. The lubrication-required part 300 includes rotating members (e.g., gears) and supporting members (e.g., bearings) that are required to be lubricated. The first line pressure-required part 100 requires a hydraulic pressure higher than the lubrication-required part 300. The lubrication-required part 300 requires a hydraulic pressure lower than the first line pressure-required part 100. In the present embodiment, as described below, the hydraulic pressure in the first line passage 11b is regulated to the first line pressure value PL1, and the hydraulic pressure in the lubricating passage 11d is regulated to a lubricant pressure value PL3 that is lower than the first line pressure value PL1. The lubricating passage 11d is located on a downstream side of the first line passage 11b in a direction of flow of the working fluid, and corresponds to "a downstream-side passage" recited in the appended claims. In this second embodiment, as described below, the hydraulic pressure in the first line passage 11b is regulated to the first line pressure value PL1 by a relief regulator valve, and the hydraulic pressure in the lubricating passage 11d is regulated to the lubricant pressure value PL3 by another relief regulator valve. As in the first embodiment, each of the relief regulator valves is configured to regulate the hydraulic pressure within a certain range.

The first outlet port 11a of the main pump 11 is connected to the first line passage 11b, so that the working fluid ejected through the first outlet port 11a of the main pump 11 is supplied to the first line pressure-required part 100 via the first line passage 11b. Meanwhile, the second outlet port 13a of the sub pump 13 is connected to a sub-pump ejection passage 13b, so that the working fluid ejected through the second outlet port 13a of the sub pump 13 is supplied to the sub-pump ejection passage 13b.

The first line passage 11b is connected to a first regulator 61 serving as the relief regulator valve. The first regulator 61 includes a first line-pressure-relief regulator valve 62, which is provided to regulate the hydraulic pressure in the first line passage 11b, by allowing a part of the working fluid in the first line passage 11b to flow out to the discharge passage EX.

The first regulator 61 includes a spring 64 and a spool valve body 61a which is provided therein and which is constantly biased or forced by the spring 64 in a valve closing direction that causes the first line-pressure-relief regulator valve 62 to be closed. The first regulator 61 is provided with a feedback passage 61b that causes the hydraulic pressure in the first line passage 11b to act on the spool valve body 61a. Thus, a feedback hydraulic pressure, which is increased with increase of the hydraulic pressure in the first line passage 11b, acts on the spool valve body 61a through the feedback passage 61b whereby the spool valve body 61a is displaced against a biasing force of the spring 64 in a valve opening direction that is opposite to the above-described valve closing direction.

When the spool valve body 61a of the first regulator 61 is displaced in the valve opening direction by a very small amount, the first line-pressure-relief regulator valve 62 is closed. When the amount of displacement of the spool valve body 61a in the valve opening direction is increased with increase of the hydraulic pressure acting on the spool valve body 61a of the first regulator 61 through the feedback passage 61b, the first line-pressure-relief regulator valve 62 is opened whereby the working fluid is caused to flow out from the first line passage 11b to the discharge passage EX, such that the hydraulic pressure in the first line passage 11b is regulated to the first line pressure value PL1. The working fluid, which is thus discharged to the discharge passage EX, is returned to the oil pump 8.

The first line passage 11*b* and the sub-pump ejection passage 13*b* are connected to an electromagnetic switching valve 41 that is configured to switch the supply path of the working fluid. The electromagnetic switching valve 41 includes a spring 44 and a spool valve body 41*a* provided therein and constantly biased or forced by the spring 44. The spool valve body 41*a* is forced, by the spring 44, to be positioned in a first position. With the spool valve body 41*a* being positioned in the first position, a first-line-passage opening/closing valve 42, which is provided between the sub-pump ejection passage 13*b* and the first line passage 11*b*, is opened, while a lubricating-passage opening/closing valve 43, which is provided between the sub-pump ejection passage 13*b* and the lubricating passage 11*d*, is closed. The electromagnetic switching valve 41 is provided with a solenoid (electromagnet) 45. With an electric current being applied to the solenoid 45, the spool valve body 41*a* is displaced against a biasing force of the spring 44 to be positioned in a second position. With the spool valve body 41*a* being positioned in the second position, the first-line-passage opening/closing valve 42 is closed while the lubricating-passage opening/closing valve 43 is opened. That is, the electromagnetic switching valve 41 opens a selected one of a supply path of the working fluid from the sub-pump ejection passage 13*b* to the first line passage 11*b* and a supply path of the working fluid from the sub-pump ejection passage 13*b* to the lubricating passage 11*d*. The solenoid 45 is controlled, by an electronic control unit (ECU) 19, based on, for example, the engine rotational speed Ne. The vehicle 600 is provided with a rotational speed sensor configured to measure the engine rotational speed Ne. A measured value of the engine rotational speed Ne, which is measured by the rotational speed sensor, is inputted to the electronic control unit 19.

As described below, the electromagnetic switching valve 41 serves as a first path-switching valve device 40.

A bypass passage 84 is provided between the sub-pump ejection passage 13*b* and the lubricating passage 11*d*, and bypasses the electromagnetic switching valve 41 serving as the first path-switching valve device 40. The bypass passage 84, which always maintains a communication between the sub-pump ejection passage 13*b* and the lubricating passage 11*d*, is provided with a flow restrictor 84*a* such as a choke or an orifice, so as to provide a flow resistance higher than a flow resistance that acts on the working fluid, which flows through the lubricating-passage opening/closing valve 43 between the sub-pump ejection passage 13*b* and the lubricating passage 11*d* when the lubricating-passage opening/closing valve 43 is opened.

The lubricating passage 11*d* is connected to a lubricant-pressure regulator 71 serving as a relief regulator valve. The lubricant-pressure regulator 71 includes a lubricant-pressure-relief regulator valve 72, which is provided to regulate the hydraulic pressure in the lubricating passage 11*d*, by allowing a part of the working fluid in the lubricating passage 11*d* to flow out to the discharge passage EX. The lubricant-pressure regulator 71 has substantially the same construction as the first regulator 61, and is configured to regulate the hydraulic pressure in the lubricating passage 11*d*, to the lubricant pressure value PL3 that is lower than the first line pressure value PL1.

Figure 5:
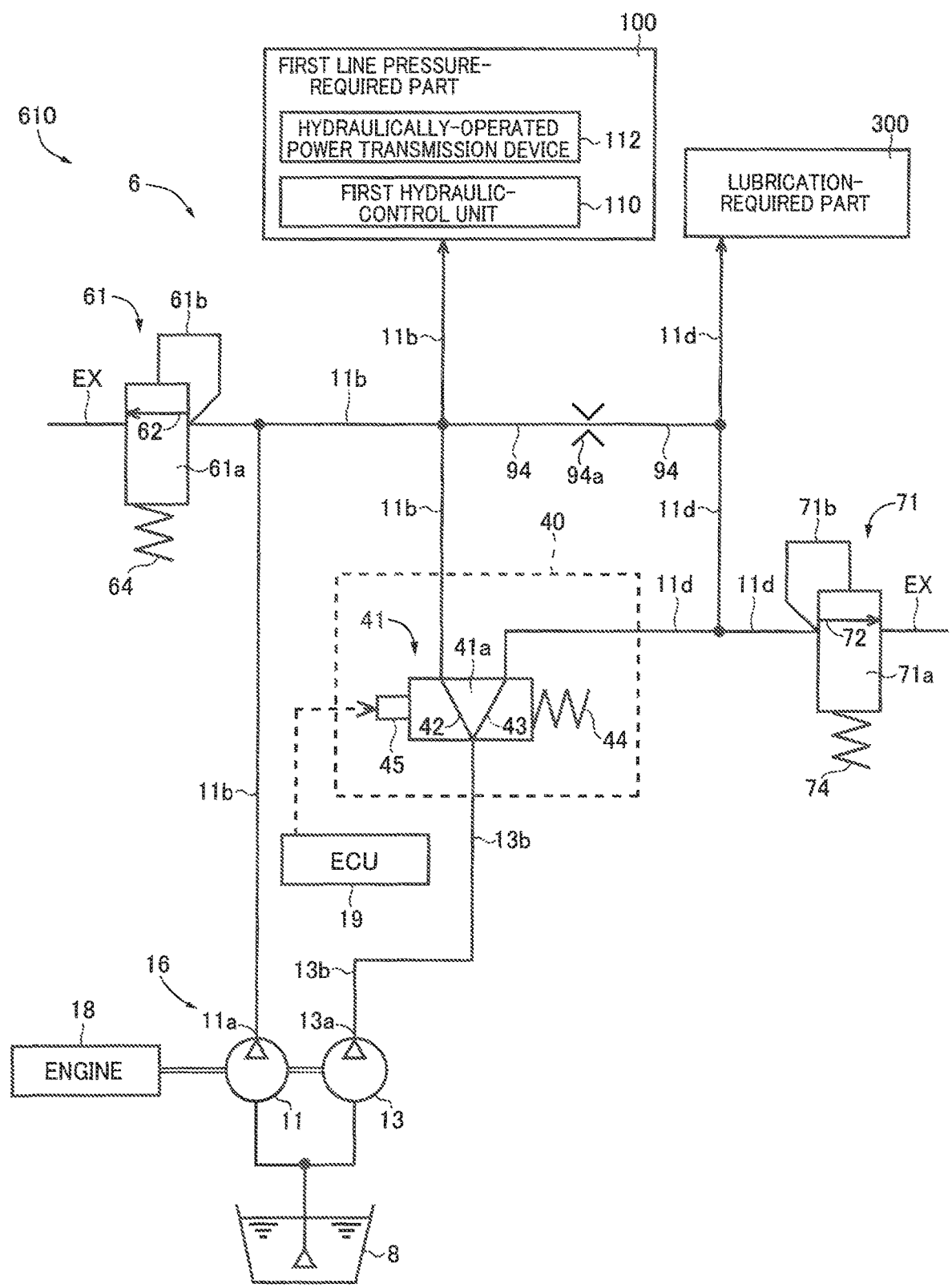
FIG. 5 is a view schematically showing a vehicle hydraulic system of a first comparative example.

FIG. 5 is a view schematically showing a vehicle hydraulic system 6 of a second comparative example. This vehicle hydraulic system 6, which is to be installed on a vehicle 610, has substantially the same as the vehicle hydraulic system 3 of the second embodiment, but is different from the vehicle hydraulic system 3 in terms of a position of a bypass passage 94 that is provided with a flow restrictor 94*a*. In the following description of this second comparative example, the same reference signs as used in the description of the second embodiment will be used to identify the functionally corresponding parts, and descriptions thereof are not provided. In the vehicle hydraulic system 6, the bypass passage 84 is not provided between the sub-pump ejection passage 13*b* and the lubricating passage 11*d*, but the bypass passage 94 is provided between the first line passage 11*b* and the lubricating passage 11*d*.

Figure 6:
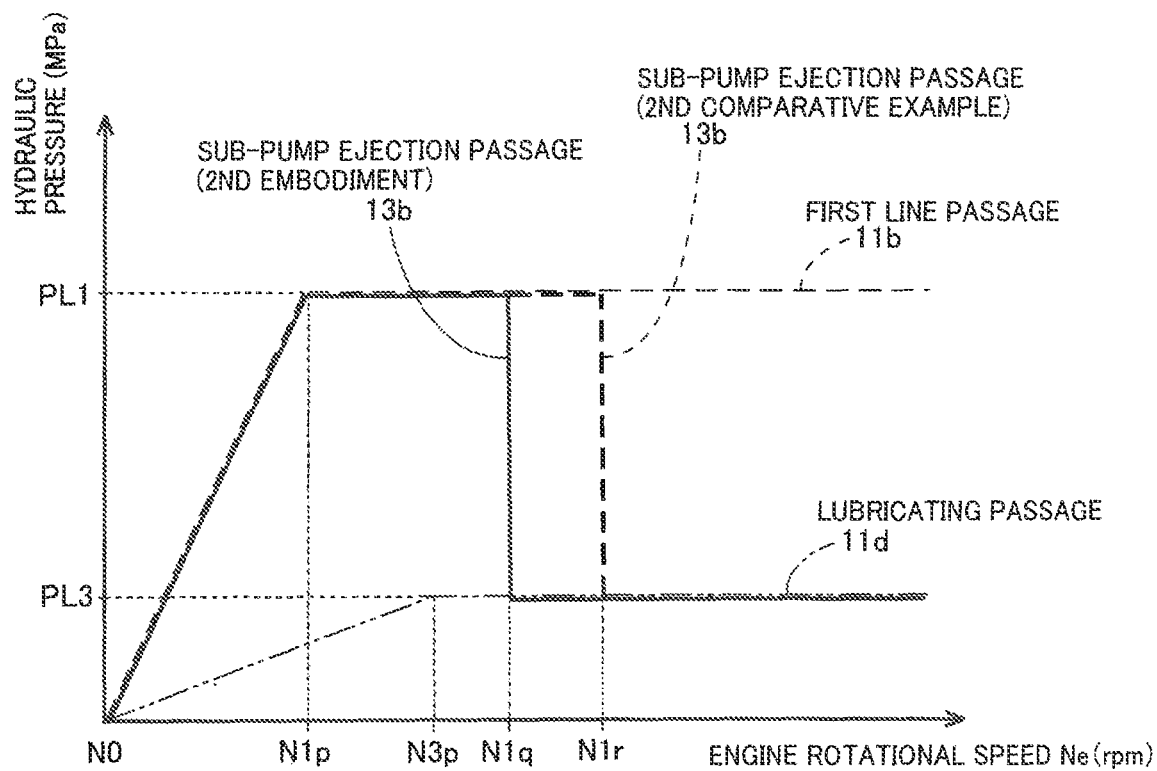
FIG. 6 is a view showing a relationship between an engine rotational speed and a hydraulic pressure in a sub-pump ejection passage of the vehicle hydraulic system of FIG. 4.

FIG. 6 is a view showing a relationship between the engine rotational speed Ne and the hydraulic pressure in the sub-pump ejection passage 13*b* of the vehicle hydraulic system 3 shown in FIG. 4, together with a relationship between the engine rotational speed Ne and the hydraulic pressure in the sub-pump ejection passage 13*b* of the vehicle hydraulic system 6 of the second comparative example shown in FIG. 5. In FIG. 6, the abscissa represents the engine rotational speed Ne while the ordinate represents the hydraulic pressure in the sub-pump ejection passage 13*b*. It is noted that the second embodiment and the second comparative example are substantially the same as each other in terms of a relationship between the engine rotational speed Ne and the hydraulic pressure in the first line passage 11*b* (which is indicated by thin broken line in FIG. 6) and a relationship between the engine rotational speed Ne and the hydraulic pressure in the lubricating passage 11*d* (which is indicated by thin two-dot chain line in FIG. 6). Described more precisely, as described below, the load of the main pump 11 in the second comparative example is larger than in the second embodiment, so that an initial rise of the hydraulic pressure in the first line passage 11*b* takes place later in the second comparative example than in the second comparative example. However, in FIG. 6, the relationship between the engine rotational speed Ne and the hydraulic pressure in the first line passage 11*b* in the second comparative example is represented as if it were the same as that in the second embodiment, for easier understanding.

Regarding FIG. 6, the relationship between the engine rotational speed Ne and the hydraulic pressure in each of the passages 11*b*, 11*d* in the vehicle hydraulic system 3 of the second embodiment will be first described. Then, the corresponding relationship in the vehicle hydraulic system 6 of the second comparative example will be described.

In a state in which the engine rotational speed Ne is lower than N1p (rpm), namely, in which the rotational speed of the pump gears of each of the main and sub pumps 11, 13 is low, the hydraulic pressure in the first line passage 11*b*, to which the working fluid is pumped from the main and sub pumps 11, 13, is very low. In this state, the solenoid 45 of the electromagnetic switching valve 41 is controlled by the electronic control unit 19 such that the first-line-passage opening/closing valve 42 is opened while the lubricating-passage opening/closing valve 43 is closed. In FIG. 6, a range N0-N1p of the engine rotational speed Ne corresponds to this state.

In this state, a part of the working fluid ejected from the sub pump 13 flows out to the lubricating passage 11*d* through the bypass passage 84. Since the bypass passage 84 is designed to provide a relatively high flow resistance, the working fluid ejected from the sub pump 13 flows out to the first line passage 11*b* through the opened first-line-passage opening/closing valve 42, except the part flowing out to the lubricating passage 11*d* through the bypass passage 84. Then, the working fluid ejected from the main pump 11 and the working fluid ejected from the sub pump 13 are both supplied to the first line pressure-required part 100 through the first line passage 11b.

As described above, the part of the working fluid, which has been ejected from the sub pump 13 to the sub-pump ejection passage 13b, flows out to the lubricating passage 11d through the bypass passage 84. The working fluid, which has been flowing into the lubricating passage 11d from the sub-pump ejection passage 13b, is supplied to the lubrication-required part 300.

As shown in FIG. 6, in the range N0-N1p of the engine rotational speed Ne, the hydraulic pressures in the respective first line passage 11b and lubricating passage 11d are gradually increased with increase of the engine rotational speed Ne. It is noted that a rate of increase of the hydraulic pressure to the engine rotational speed Ne is higher in the first line passage 11b than in the lubricating passage 11d, as shown in FIG. 6.

When the hydraulic pressure in the first line passage 11b reaches the first line pressure value PL1 with the engine rotational speed Ne being increased to N1p (rpm), the first line-pressure-relief regulator valve 62 starts to be opened, so that the working fluid starts to flow out to the discharge passage EX from the first line passage 11b whereby the hydraulic pressure in the first line passage 11b is regulated to the first line pressure value PL1. That is, the hydraulic pressure in the first line passage 11b is held in the first line pressure value PL1 as the regulated pressure value even after the engine rotational speed Ne is increased to be higher than N1p.

When the hydraulic pressure in the lubricating passage 11d reaches the lubricant pressure value PL3 (that is lower than the first line pressure value PL1) with the engine rotational speed Ne being increased to N3p (rpm) that is higher than N1p, the lubricant-pressure-relief regulator valve 72 starts to be opened, so that the working fluid starts to flow out to discharge passage EX from the lubricating passage 11d whereby the hydraulic pressure in the lubricating passage 11d is regulated to the lubricant pressure value PL3. That is, the hydraulic pressure in the lubricating passage 11d is held in the lubricant pressure value PL3 as the regulated pressure value even after the engine rotational speed Ne is increased to be higher than N3p.

When the engine rotational speed Ne reaches N1q (rpm) that is higher than N1p and N3p, the electric current flowing through the solenoid 45 is controlled by the electronic control unit 19 such that the first-line-passage opening/closing valve 42 and the lubricating-passage opening/closing valve 43 of the electromagnetic switching valve 41 are closed and opened, respectively. That is, when the electronic control unit 19 determines that the engine rotational speed Ne reaches N1q as a supply-path switching rotational speed value, based on a value inputted from the rotational speed sensor, the electronic control unit 19 controls the electric current flowing through the solenoid 45, for thereby closing and opening the first-line-passage opening/closing valve 42 and the lubricating-passage opening/closing valve 43, respectively. In this instance, a supply path of the working fluid ejected from the sub pump 13 to the sub-pump ejection passage 13b is switched except the part flowing out to the lubricating passage 11d through the bypass passage 84. Described specifically, the part of the working fluid, which has been flowing into the first line passage 11b through the first-line-passage opening/closing valve 42 until the first-line-passage opening/closing valve 42 and the lubricating-passage opening/closing valve 43 are closed and opened, respectively, starts to flow out to the lubricating passage 11d through the lubricating-passage opening/closing valve 43. Thus, the first path-switching valve device 40, which includes electromagnetic switching valve 41, for example, serves as a supply-path switcher that is configured to switch the supply path of the working fluid ejected by the sub pump 12. As shown in FIG. 6, when the engine rotational speed Ne is a range from NO to N1q, the hydraulic pressure in the sub-pump ejection passage 13b (which is indicated by thick solid line in FIG. 6) is substantially equal to the hydraulic pressure in the first line passage 11b (which is indicated by thin broken line in FIG. 3). However, after the engine rotational speed Ne has reached to N1q, the hydraulic pressure in the sub-pump ejection passage 13b (which is indicated by thick solid line in FIG. 6) becomes substantially equal to the hydraulic pressure in the lubricating passage 11d (which is indicated by thin two-dot chain line in FIG. 6). A stage at which the engine rotational speed Ne is N1q, namely, at which the first-line-passage opening/closing valve 42 and the lubricating-passage opening/closing valve 43 are closed and opened, respectively, corresponds to a stage at which the hydraulic pressure in the first line passage 11b is "a first predetermined pressure value" that is recited in the appended claims. The value N1q of the engine rotational speed Ne is a value that is predetermined such that a sufficient rate of supply of the working fluid to the first line pressure-required part 100 can be ensured by only the working fluid ejected from the main pump 11 when the engine rotational speed Ne is not lower higher than N1q.

In the vehicle hydraulic system 3 of this second embodiment, when the ejection capacity of the main pump 11 has been increased by increase of the engine rotational speed Ne to N1q, the supply path defined by the electromagnetic switching valve 41 is switched by the electronic control unit 19. With the switch of the supply path defined by the electromagnetic switching valve 41, the supply path of the working fluid ejected from the sub pump 13 is switched whereby the load of the sub pump 13 is reduced depending on increase of the ejection capacity of the main pump 11.

On the other hand, in the vehicle hydraulic system 6 of the second comparative example, the working fluid ejected from the main pump 11 always flows out to the lubricating passage 11d through the bypass passages 94. Thus, the load of the main pump 11 is larger in the second comparative example than in the second embodiment.

In the vehicle hydraulic system 3 of the second embodiment, when the engine rotational speed Ne reaches N1q, the first-line-passage opening/closing valve 42 of the electromagnetic switching valve 41 is closed whereby the supply of the working fluid to the first line pressure-required part 100 is made by only the working fluid ejected from the main pump 11. On the other hand, in the vehicle hydraulic system 6 of the second comparative example, the electromagnetic switching valve 41 has to be controlled such that the first-line-passage opening/closing valve 42 is opened until the engine rotational speed Ne reaches N1r (rpm) that is higher than N1q. This is because the load of the main pump 11 is larger in the vehicle hydraulic system 6 of the second comparative example than in the vehicle hydraulic system 3 of the second embodiment. In the second comparative example, the main pump 11 is required to have an ejection capacity higher than in the second embodiment, for making it possible to sufficiently supply the working fluid to the first line pressure-required part 100, by only the working fluid ejected from the main pump 11, since a part of the working fluid ejected from the main pump 11 always flows out to the lubricating passage 11d through the bypass passage 94. That is, the value N1r of the engine rotational speed Ne, at which the first-line-passage opening/closing valve 42 of the electromagnetic switching valve 41 is to be closed in the second comparative example, has to be higher than the value N1$q$ of the engine rotational speed Ne, at which the first-line-passage opening/closing valve 42 of the electromagnetic switching valve 41 is to be closed in the second embodiment.

In the vehicle hydraulic system 3 of the second embodiment, the supply path of the working fluid ejected from the sub pump 13 can be switched when the engine rotational speed Ne is a lower value (i.e., N1$q$) than a value (i.e., N1$r$) in the vehicle hydraulic system 6 of the second comparative example. Thus, in the vehicle hydraulic system 3 of the second embodiment, the load of the sub pump 13 is alleviated from a stage when the engine rotational speed Ne is still low.

In the vehicle hydraulic system 3 of the second embodiment, when the engine rotational speed Ne is higher than N1$q$, the working fluid ejected from the sub pump 13 is supplied to the lubrication-required part 300 through the lubricating-passage opening/closing valve 43 of the first path-switching valve device 40 and the lubricating passage 11$d$. When the engine rotational speed Ne is lower than N1$q$, the working fluid ejected from the sub pump 13 is supplied to the lubrication-required part 300 through the bypass passage 84 and the lubricating passage 11$d$. Irrespective of whether the engine rotational speed Ne is high or low, the working fluid is supplied from the sub pump 13 to the lubricating passage 11$d$, so that the load of the main pump 11 is reduced. Further, when the engine rotational speed Ne is higher than N1$q$, the supply destination of the working fluid supplied from the sub pump 13 is switched from the first line passage 11$b$ to the lubricating passage 11$d$. It is therefore possible to avoid increase of size of the main pump 11 or possible to reduce the load of the sub pump 13 and accordingly to improve the fuel economy of the vehicle 600 including the engine 18 that drives the sub pump 13.

In the vehicle hydraulic system 3 of the second embodiment, a supply-path changing rotational speed, at which the supply path of the working fluid ejected from the sub pump 13 is to be switched, can be set to a lower value (i.e., N1$q$) than a value (i.e., N1$r$) in the vehicle hydraulic system 6 of the second comparative example. Thus, unlike in the second comparative example, in the second embodiment, the load of the sub pump 13 is alleviated reduced also at a stage at which the engine rotational speed Ne is higher than N1$q$ and lower than N1$r$, so that it is possible to improve the fuel economy of the vehicle 600 including the engine 18 that drives the sub pump 13.

In the vehicle hydraulic system 3 of the second embodiment, at a stage at which the supply of the working fluid to the first line pressure-required part 100 can be made by the working fluid ejected from the main pump 11, with the engine rotational speed Ne being higher than N1$q$, the consumption of the working fluid ejected from the main pump 11 due to the outflow through the bypass passage 94, which is caused in the second comparative example, is not made. Thus, in the second embodiment, the main pump 11 is not required to have an increased ejection capacity for compensating such a consumption of the working fluid flowing out through the bypass passage 94, and accordingly the main pump 11 does not required to be made large in size.

In the vehicle hydraulic system 3 of the second embodiment, when the hydraulic pressure in the first line passage 11$b$ is lower than the first predetermined pressure value, namely, when the engine rotational speed Ne is lower than N1$q$, the electromagnetic switching valve 41 constituting the first path-switching valve device 40 makes the sub-pump ejection passage 13$b$ being in communication with the first line passage 11$b$. However, when the hydraulic pressure in the first line passage 11$b$ is higher than the first predetermined pressure value, namely, when the engine rotational speed Ne is higher than N1$q$, the electromagnetic switching valve 41 makes the sub-pump ejection passage 13$b$ being in communication with the lubricating passage 11$d$. Thus, the switch of the supply destination of the working fluid (ejected from the sub pump 13) from the first line passage 11$b$ to the lubricating passage 11$d$, is made by operation of the electromagnetic switching valve 41. Since the operation of the electromagnetic switching valve 41 is controlled by the electronic control unit 19, the above-described supply-path switching rotational speed value (as a condition to be satisfied to switch the supply path of the working fluid ejected from the sub pump 13) can be easily adjusted or changed, for example, from N1$q$ to another value.

In the vehicle hydraulic system 3 of the second embodiment, the bypass passage 84 provides the flow resistance higher than the flow resistance that acts on the working fluid flowing through the lubricating-passage opening/closing valve 43 between the sub-pump ejection passage 13$b$ and the lubricating passage 11$d$. Owing to this arrangement, when the rate of ejection of the working fluid from the sub pump 13 is low with the engine rotational speed Ne being lower than N1$q$, the supply of the working fluid ejected from the sub pump 13 to the lubricating passage 11$d$ is made, while being limited by a certain degree that is dependent on the high flow resistance of the bypass passage 84. When the rate of ejection of the working fluid from the sub pump 13 is high with the engine rotational speed Ne being higher than N1$q$, the supply of the working fluid ejected from the sub pump 13 to the lubricating passage 11$d$ is made, while being limited by a small degree which is dependent on the small flow resistance of the lubricating-passage opening/closing valve 43 and which is smaller than the above-described certain degree. That is, the supply of the working fluid ejected from the sub pump 13 to the lubricating passage 11$d$ is increased with increase of the ejection capacity of the sub pump 13.

In the vehicle hydraulic system 3 of the second embodiment, owing to the lubricant-pressure-relief regulator valve 72 that is provided to discharge the working fluid in the lubricating passage 11$d$ to the discharge passage EX, it is possible to restrain excessive increase of the hydraulic pressure in the lubricating passage 11$d$.

In the vehicle hydraulic system 3 of the second embodiment, the working fluid in the first line passage 11$b$ is supplied to the first line pressure-required part 100 that includes the first hydraulic-control unit 110 configured to control the hydraulically-operated power transmission devices 112 such as pulleys and clutches including respective hydraulic actuators, and the working fluid in the lubricating passage 11$d$ is supplied to the lubrication-required part 300 so as to lubricate the lubrication-required part 300. Thus, the working fluid is supplied to each of the first hydraulic-control unit 110 configured to control the hydraulically-operated power transmission devices 112, and the working fluid in the lubricating passage 10$d$ is supplied as the lubricant fluid to the lubrication-required part 300. Thus, the working fluid is supplied to each of the first hydraulic-control unit 110 (configured to control the hydraulically-operated power transmission devices 112) and the lubrication-required part 300, with the hydraulic pressure having a value suitable for a corresponding one of the first hydraulic-control unit 110 and lubrication-required part 300.

While the preferred embodiments of the invention have been described in detail by reference to the drawings, it is to be understood that the invention may be otherwise embodied.

In the above-described first and second embodiments, the internal combustion engine 18 constitutes the vehicle drive source configured to generate the drive force driving the wheels of the vehicle. However, the vehicle drive source may be constituted by an electric motor configured to generate a torque by an electric energy as in an electric vehicle. Further, the vehicle may be equipped with a hybrid system having both of the internal combustion engine and the electric motor as the vehicle drive sources.

The main and sub pumps 10, 12 in the first embodiment may be two mechanically-operated hydraulic pumps both of which are to be driven by the engine 18. Where the main and sub pumps 10, 12 constituting the hydraulic pump device 15 are two mechanically-operated hydraulic pumps which are to be driven by the engine 18, the ejection capacity of each of the main and sub pumps 10, 12 can be easily set individually from the other, depending on a corresponding part to which the working fluid ejected from the each pump is required to be supplied. The same thing can be said to the main and sub pumps 11, 13 constituting the hydraulic pump device 16 in the second embodiment.

Figure 8:
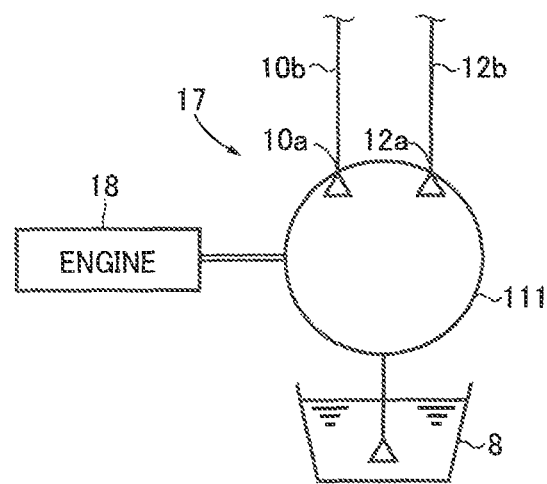
FIG. 8 is a view schematically showing a modification of a hydraulic pump device that is included in the vehicle hydraulic system constructed according to each of the embodiments of the invention.

The hydraulic pump device 15, which is constituted by the main and sub pumps 10, 12 in the first embodiment, may be replaced by a hydraulic pump device 17, as shown in FIG. 8, which is constituted by constituted by a single mechanically-operated hydraulic pump 111. The term "single" is interpreted to mean that the mechanically-operated hydraulic pump is integrally constructed to be undividable. For example, where the mechanically-operated hydraulic pump is a gear pump that is provided with an inlet port, a pair of outlet ports and pump gears that are common to the inlet port and the pair of outlet ports, it can be interpreted that the two outlet ports are provided in a single mechanically-operated hydraulic pump. The hydraulic pump device can be made compact in size as a whole, where the hydraulic pump device having the pair of outlet ports is constituted by a single mechanically-operated hydraulic pump. The same thing can be said to the main and sub pumps 11, 13 constituting the hydraulic pump device 16 in the second embodiment.

In the first embodiment, the first flow-control valve 23 and the first line-pressure-relief regulator valve 22, which cooperate with each other to constitute the first pair of valves, are provided in a pressure-relief-control valve in the form of the first regulator 21, and the second flow-control valve 33 and the second line-pressure-relief regulator valve 32, which cooperate with each other to constitute the second pair of valves, are provided in another pressure-relief-control valve in the form of the second regulator 31. However, even where only one of the first and second pairs of valves is provided in the same pressure-relief-control valve, the hydraulic pressure unit can be made smaller in size with a reduced number of components. Further, the first pair of valves of the first regulator 21 may be provided in respective pressure-relief-control valves, and the second pair of valves of the second regulator 31 may be provided in respective pressure-relief-control valves.

Figure 7:
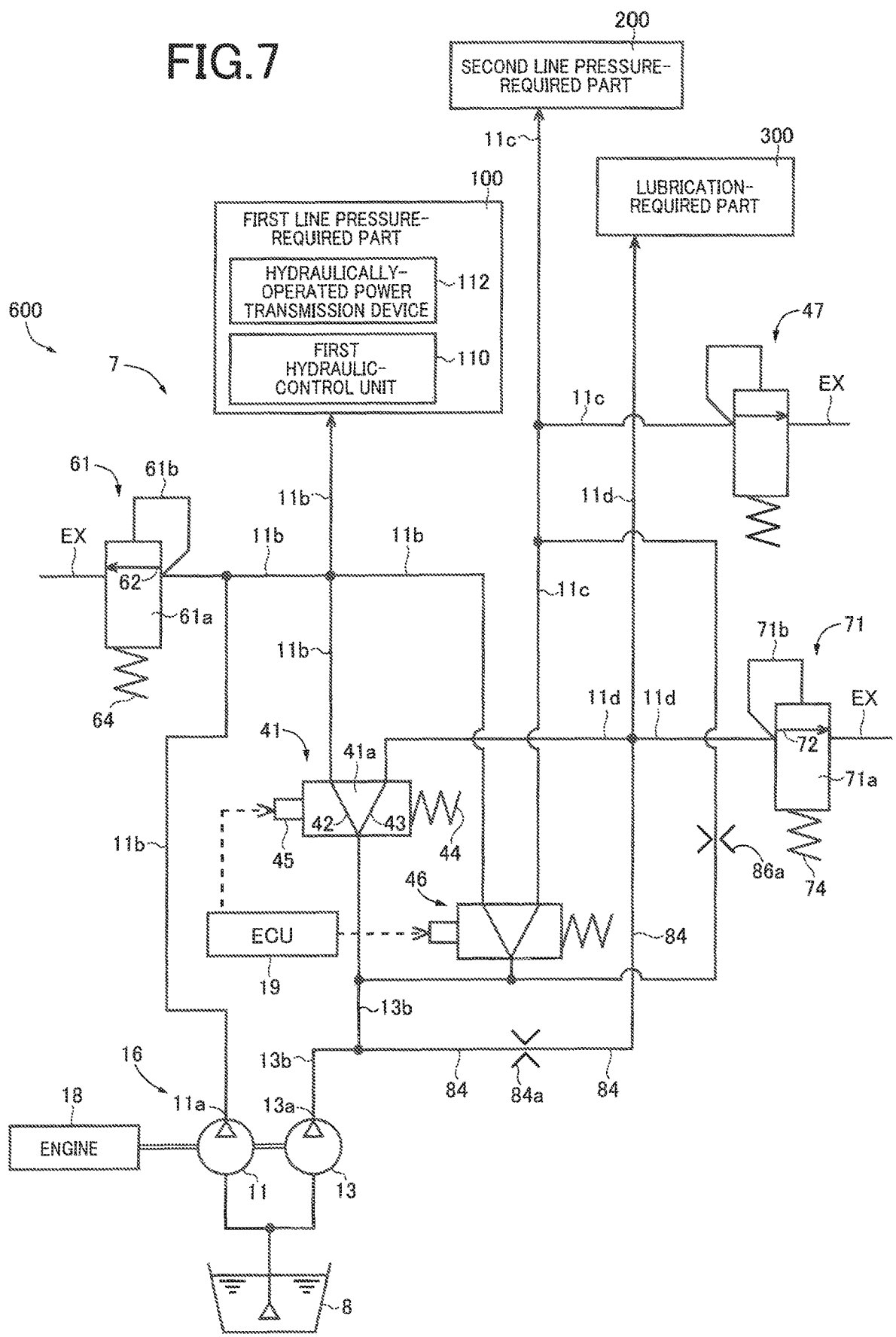
FIG. 7 is a view schematically showing a vehicle hydraulic system constructed according to a modification of the second embodiment of the invention.

Unlike in the first embodiment, in the second embodiment, the second line pressure-required part 200 and the second line passage 10c are not provided. However, the second embodiment may be modified as shown in FIG. 7 that shows a vehicle hydraulic system 7 constructed according to a modification of the second embodiment. This modification is different from the second embodiment in that the second line pressure-required part 200 and a second line passage 11c are additionally provided and a bypass passage 86 is additionally provided between the second line passage 11c and the sub-pump ejection passage 13b, and in that an electromagnetic switching valve 46 and a regulator 47 are additionally provided. The electromagnetic switching valve 46, which has substantially the same construction as the electromagnetic switching valve 41, is configured to open a selected one of a supply path of the working fluid from the sub-pump ejection passage 13b to the first line passage 11b and a supply path of the working fluid from the sub-pump ejection passage 13b to the second line passage 11c. The regulator 47 serving as a relief regulator valve is provided to be connected to the second line passage 11c. The hydraulic pressure in the second line passage 11c is regulated, by the regulator 47 that has substantially the same construction as the lubricant-pressure regulator 71, to a value that is lower than the first line pressure value PL1 and higher than the lubricant pressure value PL3. The supply destination of the working fluid ejected from the sub pump 13 is switched, by the electromagnetic switching valve 46, from the first line passage 11b to the second line passage 11c when the engine rotational speed Ne is a value that is lower than N1$q$ at which the supply destination of the working fluid ejected from the sub pump 13 is switched, by the electromagnetic switching valve 41, from the first line passage 11b to the lubricating passage 11d. In this modification shown in FIG. 7, the lubricating passage 11d corresponds to "the downstream-side passage" recited in the appended claims.

Although the second line pressure-required part 200 and the second line passage 10c are provided in the first embodiment, the first embodiment may be modified such that the second line pressure-required part 200 and the second line passage 10c are not provided. In this modification, the second regulator 31, second one-way valve 35, second line pressure-required part 200, second bypass passage 82, second line passage 10c and intermediate connecting passage 12c are omitted. Further, outlets ports of the first line-pressure-relief regulator valve 22 and first flow-control valve 23 are connected to the lubricating passage 10d such that the working fluid flowing through each of the valves 22, 23 flows out to the lubricating passage 10d. Moreover, the first bypass passage 80 is connected to the lubricating passage 10d such that the working fluid flowing through the first bypass passage 80 flows out to the lubricating passage 10d. In this modification, the lubricating passage 10d corresponds to "the downstream-side passage" recited in the appended claims.

In the first embodiment, the first and second bypass passages 80, 82 are both provided between the second outlet port 12a and the lubricating passage 10d. However, the first embodiment may be modified such that the intermediate connecting passage 12c and the lubricating passage 10d are isolated from each other without provision of the second bypass passage 82 while the second outlet port 12a and the intermediate connecting passage 12c are connected to each other through the first bypass passage 80. Further, in this modification, the second line passage 10c and the lubricating passage 10d are connected to each other through the second bypass passage 92, as in the first comparative example. In this modification, too, the working fluid ejected through the second outlet port 12a is always supplied to the lubricating passage 10d through the first bypass passage 80, intermediate connecting passage 12c, second one-way valve 35, second line passage 10c and second bypass passage 92, as long as the one-way valve 35 is opened. In this modification, at a stage at which the engine rotational speed Ne becomes so high that the supply of the working fluid to any of the first and second line pressure-required parts 100, 200 and the lubrication-required part 300 can be made by only the working fluid ejected from the main pump 10, the consumption of the working fluid ejected from the main pump 10 due to the outflow through the first bypass passage, which is caused in the first comparative example, is not caused, although the consumption due to the outflow through the second bypass passage 92 is caused. Thus, in this modification, the main pump 10 is not required to have an increased ejection capacity for compensating such a consumption of the working fluid flowing out through the first bypass passage, which is caused in the first comparative example, and accordingly the main pump 10 can be made smaller in size than in the first comparative example. Further, in the second embodiment, the first line passage 11b and the lubricating passage 11d are provided. However, the second embodiment may be modified such that the lubricating passage 11d and the lubrication-required part 300 are replaced by the second line passage 11c and the second line pressure-required part 200, respectively. In this modification, when the engine rotational speed Ne is high, the working fluid ejected from the sub pump 13 is supplied to the second line pressure-required part 200 through the electromagnetic switching valve 41. When the engine rotational speed Ne is low, the working fluid ejected from the sub pump 13 is supplied to the second line pressure-required part 200 through the bypass passage 84. In this modification, the second line passage 11c corresponds to "the downstream-side passage" recited in the appended claims.

In each of the first regulators 21, 61, second regulator 31 and lubricant-pressure regulators 51, 71 in the first and second embodiments, the spool valve body is forced or biased by only a corresponding one of the springs 24, 64, 34, 54, 74. However, a solenoid may be additionally provided in each of the regulators, such that the additionally provided solenoid cooperates with the corresponding one of the springs 24, 64, 34, 54, 74, so as to force or bias the spool body with a biasing force that is changeable through a control applied to the additionally provided solenoid. In this modification, the amount of displacement of the spool valve body in relation with a magnitude of the hydraulic pressure acting on the spool body through the feedback passage can be adjusted with the additionally provided solenoid being controlled.

It is to be understood that the embodiments described above are given for illustrative purpose only, and that the present invention may be embodied with various modifications and improvements which may occur to those skilled in the art.

NOMENCLATURE OF ELEMENTS 2, 3, 5, 6: vehicle hydraulic system
10, 11: main pump (first pump)
10a, 11a: first outlet port
10b, 11b: first line passage
10c: second line passage (downstream-side passage)
10d, 11d: lubricating passage (downstream-side passage)
12, 13: sub pump (second pump)
12a, 13a: second outlet port
12b, 13b: sub-pump ejection passage
12c: intermediate connecting passage
18: engine (vehicle drive source)
20, 40: first path-switching valve device
21: first regulator (pressure-relief-control valve)
22: first line-pressure-relief regulator valve
23: first flow-control valve
25: first one-way valve
30: second path-switching valve device
31: second regulator (pressure-relief-control valve)
32: second line-pressure-relief regulator valve
33: second flow-control valve
35: second one-way valve
41: electromagnetic switching valve
42: first-line-passage opening/closing valve
43: lubricating-passage opening/closing valve
80: first bypass passage (bypass passage)
82: second bypass passage (bypass passage)
84: bypass passage
100: first line pressure-required part
200: second line pressure-required part
300: lubrication-required part
EX: discharge passage

What is claimed is:

1. A hydraulic system for a vehicle, comprising:
a hydraulic pump device configured to be driven by a vehicle drive source of the vehicle to eject a working fluid through first and second outlet ports of the hydraulic pump device;
a first line passage that guides at least the working fluid ejected through the first outlet port, with a hydraulic pressure in the first line passage being regulated to a first line pressure value;
a downstream-side passage in which hydraulic pressure is regulated to a downstream-side pressure value that is lower than the first line pressure value;
a first path-switching valve device configured to:
allow the working fluid ejected through the second outlet port to flow into the first line passage when the hydraulic pressure in the first line passage is lower than a first predetermined pressure value; and
allow the working fluid ejected through the second outlet port to flow into the downstream-side passage when the hydraulic pressure in the first line passage is higher than the first predetermined pressure value; and
a bypass passage that maintains a communication between the second outlet port and the downstream-side passage.

2. The hydraulic system according to claim 1,
wherein the hydraulic pump device includes two mechanically-operated hydraulic pumps configured to be driven by the vehicle drive source, and
the two mechanically-operated hydraulic pumps includes a first pump provided with the first outlet port and a second pump provided with the second outlet port.

3. The hydraulic system according to claim 1, wherein the hydraulic pump device includes a single mechanically-operated hydraulic pump configured to be driven by the vehicle drive source and is provided with the first and second outlet ports.

4. The hydraulic system according to claim 1, wherein the first path-switching valve device includes:
a first flow-control valve configured to allow the working fluid ejected through the second outlet port, to flow out to the downstream-side passage, depending on increase of the hydraulic pressure in the first line passage; and
a first one-way valve disposed between the second outlet port and the first line passage, and configured to allow the working fluid to flow in a direction away from the second outlet port toward the first line passage and to inhibit the working fluid to flow in a direction away from the first line passage toward the second outlet port.

5. The hydraulic system according to claim 4, wherein the downstream-side passage includes (i) a second line passage in which the hydraulic pressure is regulated to a second line pressure value that is lower than the first line pressure value, and (ii) a lubricating passage in which hydraulic pressure is regulated to a lubricant pressure value that is lower than the second line pressure value, the hydraulic system further comprising:
    a second path-switching valve device including:
        (a) a second flow-control valve configured to allow the working fluid having flowed into an intermediate connecting passage from the first flow-control valve, to flow out to the lubricating passage, depending on increase of the hydraulic pressure in the second line passage; and
        (b) a second one-way valve disposed between the intermediate connecting passage and the second line passage, and configured to allow the working fluid to flow in a direction away from the intermediate connecting passage toward the second line passage and to inhibit the working fluid to flow in a direction away from the second line passage toward the intermediate connecting passage, the second path-switching valve device being configured to allow the working fluid to flow from the intermediate connecting passage to the second line passage when the hydraulic pressure in the second line passage is lower than a second predetermined pressure value, and allow the working fluid to flow from the intermediate connecting passage to the lubricating passage when the hydraulic pressure in the second line passage is higher than the second predetermined pressure value; and
    a second line-pressure-relief regulator valve configured to cause the hydraulic pressure in the second line passage to be regulated to the second line pressure value by allowing a part of the working fluid in the second line passage to flow out to the lubricating passage,
    wherein the bypass passage includes a first bypass passage provided between the second outlet port and the intermediate connecting passage and a second bypass passage provided between the intermediate connecting passage and the lubricating passage.

6. The hydraulic system according to claim 5,
wherein the first bypass passage provides a flow resistance acting on the working fluid flowing through the first bypass passage, such that the flow resistance provided by the first bypass passage is higher than a flow resistance acting on the working fluid flowing through the first flow-control valve between the second outlet port and the intermediate connecting passage, and
the second bypass passage provides a flow resistance acting on the working fluid flowing through the second bypass passage, such that the flow resistance provided by the second bypass passage is higher than a flow resistance acting on the working fluid flowing through the second flow-control valve between the intermediate connecting passage and the lubricating passage.

7. The hydraulic system according to claim 5,
wherein the first line passage is connected to a first hydraulic-control unit configured to control a hydraulically-operated power transmission device, such that the working fluid passing through the first line passage is supplied to the first hydraulic-control unit,
the second line passage is connected to a second hydraulic-control unit configured to control a torque convertor, such that the working fluid passing through the second line passage is supplied to the second hydraulic-control unit, and
the lubricating passage is connected to a lubrication-required part, such that the working fluid passing through the lubricating passage is supplied as a lubricant fluid to the lubrication-required part.

8. The hydraulic system according to claim 5,
wherein the first flow-control valve and the first line-pressure-relief regulator valve cooperate with each other to constitute a first pair of valves, and the second flow-control valve and the second line-pressure-relief regulator valve cooperate with each other to constitute a second pair of valves, and
each of at least one of the first pair of valves and the second pair of valves is provided in a single pressure-relief-control valve.

9. The hydraulic system according to claim 5, further comprising:
    a lubricant-pressure-relief regulator valve configured to cause the hydraulic pressure in the lubricating passage to be regulated to the lubricant pressure value by allowing a part of the working fluid in the lubricating passage to flow out to a discharge passage.

10. The hydraulic system according to claim 1, further comprising:
    a first line-pressure-relief regulator valve configured to cause the hydraulic pressure in the first line passage to be regulated to the first line pressure value by allowing a part of the working fluid in the first line passage to flow out to the downstream-side passage.

11. The hydraulic system according to claim 1, wherein the first path-switching valve device includes an electromagnetic switching valve configured to:
    cause the second outlet port to be in communication with the first line passage when the hydraulic pressure in the first line passage is lower than the first predetermined pressure value; and
    cause the second outlet port to be in communication with the downstream-side passage when the hydraulic pressure in the first line passage is higher than the first predetermined pressure value.

12. The hydraulic system according to claim 11, wherein the bypass passage provides a flow resistance acting on the working fluid flowing through the bypass passage, such that the flow resistance provided by the bypass passage is higher than a flow resistance acting on the working fluid flowing through the electromagnetic switching valve between the second outlet port and the downstream-side passage.

13. The hydraulic system according to claim 1, wherein the downstream-side passage includes a lubricating passage in which hydraulic pressure is regulated to a lubricant pressure value that is lower than the first line pressure value.

* * * * *